(12) United States Patent
Liu et al.

(10) Patent No.: US 12,641,622 B2
(45) Date of Patent: May 26, 2026

(54) CONTROL INFORMATION FOR MULTIPLE RADIO ACCESS TECHNOLOGY CARRIER AGGREGATION

(71) Applicant: QUALCOMM Incorporated, San Diego, CA (US)

(72) Inventors: Kangqi Liu, San Diego, CA (US); Jing Sun, San Diego, CA (US); Kianoush Hosseini, San Diego, CA (US); Jing Lei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 385 days.

(21) Appl. No.: 18/363,434

(22) Filed: Aug. 1, 2023

(65) Prior Publication Data

US 2025/0048387 A1    Feb. 6, 2025

(51) Int. Cl.
*H04W 72/232* (2023.01)
*H04W 72/51* (2023.01)

(52) U.S. Cl.
CPC ......... *H04W 72/232* (2023.01); *H04W 72/51* (2023.01)

(58) Field of Classification Search
CPC ... H04W 72/232; H04W 72/51; H04W 88/06; H04W 72/23
USPC .................................................. 370/329–330
See application file for complete search history.

(56) References Cited

U.S. PATENT DOCUMENTS

| | | | | |
|---|---|---|---|---|
| 2019/0013881 A1* | 1/2019 | Olesen | ................. | H04B 7/0413 |
| 2019/0173626 A1* | 6/2019 | Wang | .................... | H04L 1/1867 |
| 2020/0304230 A1* | 9/2020 | Papasakellariou | .... | H04L 5/0094 |
| 2021/0274535 A1* | 9/2021 | Yi | .......................... | H04W 24/08 |
| 2022/0330245 A1* | 10/2022 | Hang | ..................... | H04L 5/0053 |
| 2023/0091462 A1* | 3/2023 | Babaei | .................. | H04W 72/23 |
| | | | | 370/329 |
| 2023/0276508 A1* | 8/2023 | Sun | .................... | H04W 72/1273 |
| | | | | 370/329 |

* cited by examiner

*Primary Examiner* — Candal Elpenord

(74) *Attorney, Agent, or Firm* — Holland & Hart LLP

(57) ABSTRACT

Methods, systems, and devices for wireless communications are described. The techniques described herein relate to control signaling for multiple radio access technology (RAT) carrier aggregation. A user equipment (UE) receives downlink control information (DCI) for a first RAT (e.g., 5G) and/or a second RAT (e.g., 6G), in a downlink control channel of the first RAT. The UE determines whether the DCI is associated with the first RAT or the second RAT by monitoring different search spaces, different control resource sets (CORESETs), different radio network temporary identifiers (RNTIs), different DCI lengths, different indication fields of the DCI, different capability parameters, and/or wake-up signals, that are associated with the downlink control channel communicated via the first RAT. The UE 115 communicates via the second RAT based on receiving the DCI.

30 Claims, 15 Drawing Sheets

305-c

CORESET for 5G PDCCH 310-a

Search Space 1 for 5G
PDCCH carrying 6G DCI 310-b

Search Space 2 for 5G
PDCCH carrying 5G DCI 305-a

CORESET 1 for 5G
PDCCH carrying 6G DCI 305-b

CORESET 2 for 5G
PDCCH carrying 5G DCI

300

615-a 620-a 6G carrier #1

6G DCI Payload | Scrambled by RNTI 1

615-b 620-b 6G carrier #2

6G DCI Payload | Scrambled by RNTI 2

605-a    615-c    620-a 6G carrier #1

605-b    615-d    620-a 6G carrier #2

0 | 6G DCI Payload | Scrambled by RNTI 1

1 | 6G DCI Payload | Scrambled by RNTI 1

CIF

600

115-b 105-b

805
Transmitting a report indicating capability parameters

Receiving a DCI for a first RAT and/or a second RAT
810

815
Determining whether the DCI is associated with the first RAT or the second RAT 820
Communicating via the second RAT based on the DCI

800

Receive a downlink control information for a first radio access technology, or a second radio access technology, or both, in a downlink control channel of the first radio access technology

1305

Communicate via the second radio access technology based on receiving the downlink control information

1310

1300

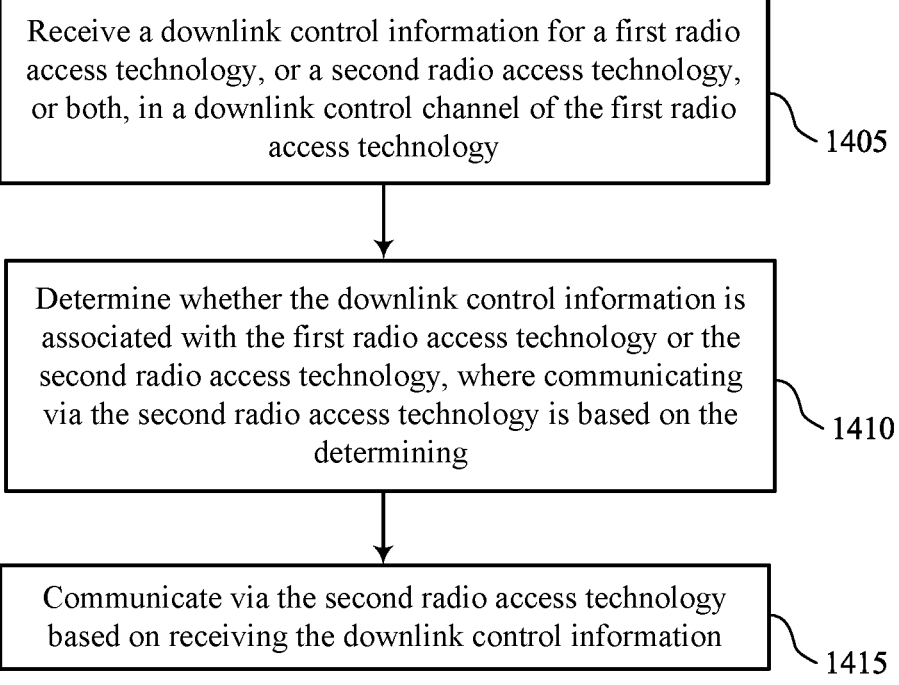

Receive a downlink control information for a first radio access technology, or a second radio access technology, or both, in a downlink control channel of the first radio access technology

1405

Determine whether the downlink control information is associated with the first radio access technology or the second radio access technology, where communicating via the second radio access technology is based on the determining

1410

Communicate via the second radio access technology based on receiving the downlink control information

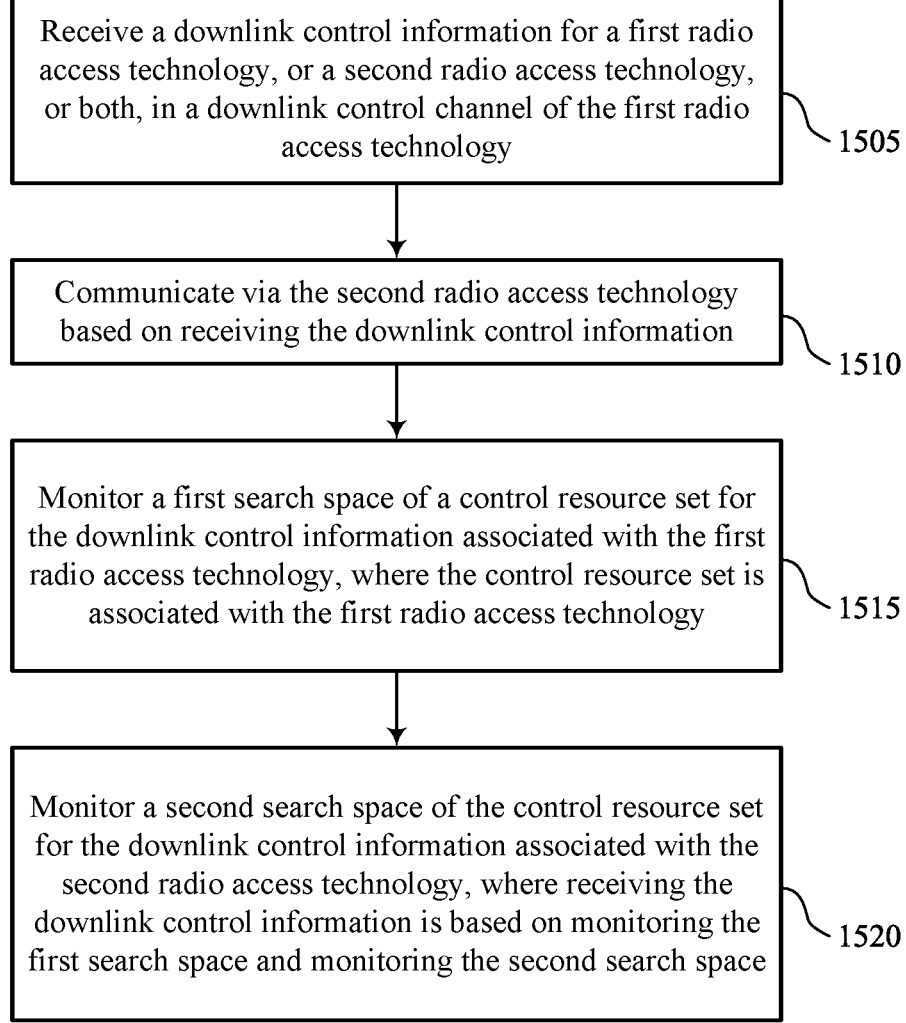

Receive a downlink control information for a first radio access technology, or a second radio access technology, or both, in a downlink control channel of the first radio access technology

1505

Communicate via the second radio access technology based on receiving the downlink control information

1510

Monitor a first search space of a control resource set for the downlink control information associated with the first radio access technology, where the control resource set is associated with the first radio access technology

1515

Monitor a second search space of the control resource set for the downlink control information associated with the second radio access technology, where receiving the downlink control information is based on monitoring the first search space and monitoring the second search space

CONTROL INFORMATION FOR MULTIPLE RADIO ACCESS TECHNOLOGY CARRIER AGGREGATION

FIELD OF TECHNOLOGY

The following relates to wireless communications, including control information for multiple radio access technology carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, multiple radio access technologies (RATs) may coexist in a multiple RAT (multi-RAT) carrier aggregation system to efficiently utilize a radio spectrum. For example, a wireless communication system may operate using a 5G RAT and a sixth generation (6G) RAT. The 5G RAT may utilize different portions of the radio spectrum than the 6G RAT. For example, the 6G RAT may use relatively higher frequencies of the radio spectrum than the 5G RAT. In some cases, communications over the higher frequencies of the spectrum may be relatively less reliable than lower frequencies of the spectrum. Accordingly, to ensure successful communications for the 6G RAT, such as for downlink control information (DCI), the 6G RAT may expand spectrum usage to include lower frequencies of the radio spectrum, which are used by the 5G RAT. In such cases, a 5G DCI and a 6G DCI may be transmitted over a 5G physical downlink control channel (PDCCH). However, distinguishing between a 5G DCI and a 6G DCI that is transmitted by the 5G PDCCH may be difficult.

SUMMARY

The described techniques relate to improved methods, systems, devices, and apparatuses that support multiple radio access technology (RAT) carrier aggregation. A user equipment (UE) may receive a downlink control information (DCI) for a first RAT (e.g., fifth generation (5G) RAT) and/or a second RAT (e.g., sixth generation (6G) RAT) in a downlink control channel, such as a physical downlink control channel (PDCCH)), that is communicated via the first RAT. The UE may communicate via the second RAT based on receiving the DCI. In particular, the UE may determine whether the DCI is associated with the first RAT or the second RAT using DCI monitoring, and then communicate using the second RAT based on the determination.

To determine whether the DCI is associated with the first RAT or the second RAT, the UE may monitor different search spaces, different control resource sets (CORESETs), different radio network temporary identifiers (RNTIs), different DCI lengths, different indication fields of the DCI, different capability parameters, or wake-up signals, that are associated with the downlink control channel communicated via the first RAT. Accordingly, the UE may receive the DCI for the second RAT (e.g., 6G RAT) using control signaling for the first RAT (e.g., 5G RAT). DCI monitoring when using the first RAT to receive the second RAT DCI may facilitate a smoother transition between the RATs and may also increase reliability in communicating DCI. Moreover, DCI monitoring for 6G DCI and 5G DCI may increase DCI functionality in the first RAT with minimal or no impact to the first RAT.

A method for wireless communications by a UE is described. The method may include receiving a DCI for a first RAT, or a second RAT, or both, in a downlink control channel of the first RAT and communicating via the second RAT based on receiving the DCI.

A UE for wireless communications is described. The UE may include one or more memories storing processor executable code, and one or more processors coupled with the one or more memories. The one or more processors may individually or collectively operable to execute the code to cause the UE to receive a DCI for a first RAT, or a second RAT, or both, in a downlink control channel of the first RAT and communicate via the second RAT based on receiving the DCI.

Another UE for wireless communications is described. The UE may include means for receiving a DCI for a first RAT, or a second RAT, or both, in a downlink control channel of the first RAT and means for communicating via the second RAT based on receiving the DCI.

A non-transitory computer-readable medium storing code for wireless communications is described. The code may include instructions executable by a processor to receive a DCI for a first RAT, or a second RAT, or both, in a downlink control channel of the first RAT and communicate via the second RAT based on receiving the DCI.

Some examples of the method, UEs, and non-transitory computer-readable medium described herein may further include operations, features, means, or instructions for determining whether the DCI may be associated with the first RAT or the second RAT, where communicating via the second RAT may be based on the determining.

Some examples of the method, UEs, and non-transitory computer-readable medium described herein may further include operations, features, means, or instructions for monitoring a first search space of a CORESET for the DCI associated with the first RAT, where the CORESET may be associated with the first RAT and monitoring a second search space of the CORESET for the DCI associated with the second RAT, where receiving the DCI may be based on monitoring the first search space and monitoring the second search space.

In some examples of the method, UEs, and non-transitory computer-readable medium described herein, the first search space and the second search space may be non-overlapping.

In some examples of the method, UEs, and non-transitory computer-readable medium described herein, the first search space and the second search space overlap and the first search space may be associated with a first RNTI and the second search space may be associated with a second RNTI, where receiving the DCI may be based on the first RNTI the second RNTI.

In some examples of the method, UEs, and non-transitory computer-readable medium described herein, the first search space and the second search space overlap and the first search space may be associated with a first DCI length and the second search space may be associated with a second DCI length, where receiving the DCI may be based on the first DCI length and the second DCI length.

Some examples of the method, UEs, and non-transitory computer-readable medium described herein may further include operations, features, means, or instructions for monitoring a search space of a CORESET for the DCI, generating a first candidate value of the DCI using a first RNTI associated with the first RAT based on monitoring the search space, and generating a second candidate value of the DCI using a second RNTI associated with the second RAT based on monitoring the search space, where receiving the DCI may be based on generating the first candidate value and generating the second candidate value.

Some examples of the method, UEs, and non-transitory computer-readable medium described herein may further include operations, features, means, or instructions for monitoring a search space of a CORESET for the DCI, generating a first candidate value of the DCI using a first DCI length associated with the first RAT based on monitoring the search space, and generating a second candidate value of the DCI using a second DCI length associated with the second RAT based on monitoring the search space, where receiving the DCI may be based on generating the first candidate value and generating the second candidate value.

Some examples of the method, UEs, and non-transitory computer-readable medium described herein may further include operations, features, means, or instructions for monitoring a first search space of a first CORESET for the DCI associated with the first RAT, where the first CORESET may be associated with the first RAT and monitoring a second search space of a second CORESET for the DCI associated with the second RAT, where the second CORESET may be associated with the second RAT, where receiving the DCI may be based on monitoring the first search space and monitoring the second search space.

In some examples of the method, UEs, and non-transitory computer-readable medium described herein, the DCI includes an indication field indicative of whether the DCI may be associated with the first RAT or the second RAT.

In some examples of the method, UEs, and non-transitory computer-readable medium described herein, receiving the DCI may include operations, features, means, or instructions for receiving the DCI associated with the second RAT via the RAT, where the DCI includes a first RNTI indicative of a first band of the second RAT or a second RNTI indicative of a second band of the second RAT.

Some examples of the method, UEs, and non-transitory computer-readable medium described herein may further include operations, features, means, or instructions for transmitting a report indicating one or more capability parameters associated with communicating control information for the second RAT, where receiving the DCI for the second RAT based on transmitting the report.

In some examples of the method, UEs, and non-transitory computer-readable medium described herein, the one or more capability parameters include a timing gap between receiving the DCI via the downlink control channel of the first RAT and communicating via the second RAT.

Some examples of the method, UEs, and non-transitory computer-readable medium described herein may further include operations, features, means, or instructions for receiving a request for the report indicating the one or more capability parameters, where transmitting the report may be based on receiving the request.

Some examples of the method, UEs, and non-transitory computer-readable medium described herein may further include operations, features, means, or instructions for receiving a wake-up signal via a first radio component associated with the first RAT that includes a payload, where the DCI that may be associated with the second RAT may be included in the payload and activating a second radio component associated the second RAT based on the DCI being associated with the second RAT.

BRIEF DESCRIPTION OF THE DRAWINGS

FIGS. 13 through 15 show flowcharts illustrating methods that support control information for multiple radio access technology carrier aggregation in accordance with one or more aspects of the present disclosure.

DETAILED DESCRIPTION

In some wireless communication systems, multiple radio access technologies (RATs) may coexist in a multiple RAT (multi-RAT) carrier aggregation system to efficiently utilize a radio spectrum. For example, a wireless communication system may operate using a fifth generation (5G) RAT and a sixth generation (6G) RAT. The 5G RAT may utilize different portions of the radio spectrum than the 6G RAT. For example, the 6G RAT may use relatively higher frequencies of the radio spectrum than the 5G RAT. In some cases, communications over the higher frequencies of the spectrum may be relatively less reliable than lower frequencies of the spectrum. Accordingly, to ensure successful communications for the 6G RAT, such as for downlink control information (DCI), the 6G RAT may expand spectrum usage to include lower frequencies of the radio spectrum, which are used by the 5G RAT. In such cases, a 5G DCI and a 6G DCI may be transmitted over a 5G physical downlink control channel (PDCCH). However, distinguishing between a 5G DCI and a 6G DCI that is transmitted by the 5G PDCCH may be difficult.

A user equipment (UE) may receive a DCI for a first RAT (e.g., 5G RAT) or a second RAT (e.g., 6G RAT) in a downlink control channel (e.g., a PDCCH) communicated via the first RAT. The UE may communicate via the second RAT based on receiving the DCI via the first RAT. In particular, the UE may determine whether the DCI is associated with the first RAT or the second RAT using DCI monitoring, and then communicate via the second RAT based on the determination. To determine whether the DCI is associated with the first RAT or the second RAT in the DCI monitoring, the UE may monitor different search spaces, different control resource sets (CORESETs), different radio network temporary identifiers (RNTIs), different DCI lengths, different indication fields of the DCI, different capability parameters, and/or wake-up signals, that are associated with the downlink control channel communicated via the first RAT (e.g., 5G PDCCH). Accordingly, the UE may receive the DCI for the second RAT (e.g., 6G) using control signaling for the first RAT (e.g., 5G). DCI monitoring when using the first RAT to receive the second RAT DCI may facilitate a smoother transition between the RATs and may also increase reliability in communicating DCI. Moreover, DCI monitoring for 6G DCI and 5G DCI may increase DCI functionality in the first RAT with minimal or no impact to the first RAT. Aspects of the disclosure are initially described in the context of wireless communications systems. Aspects of the disclosure are further illustrated by and described with reference to apparatus diagrams, system diagrams, and flowcharts that relate to control information for multiple radio access technology carrier aggregation.

Figure 1:
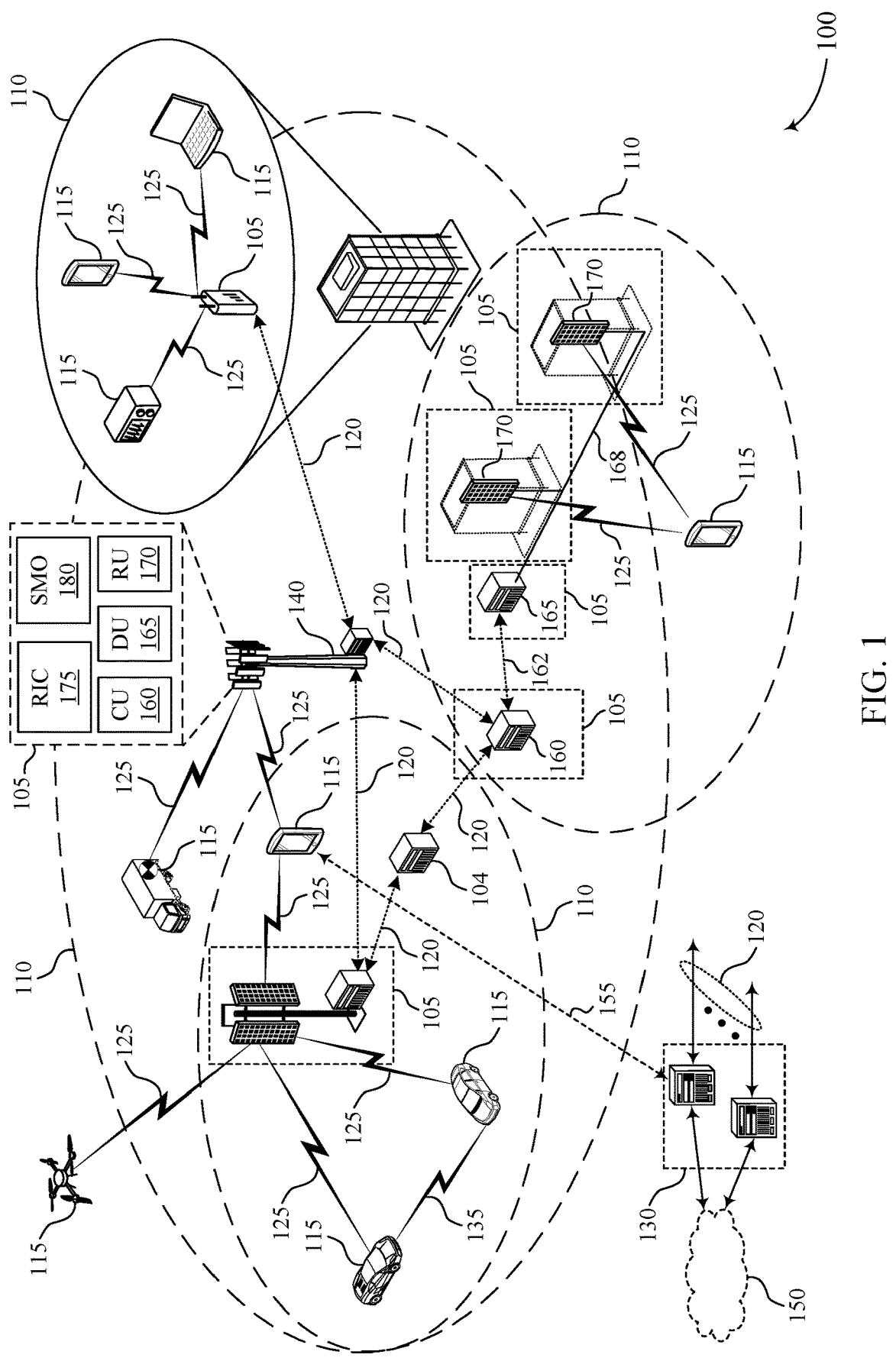
FIG. 1 shows an example of a wireless communications system that supports control information for multiple radio access technology carrier aggregation in accordance with one or more aspects of the present disclosure.

FIG. 1 shows an example of a wireless communications system 100 that supports control information for multiple radio access technology carrier aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control information for multiple radio access technology carrier aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, multi-RAT technologies may coexist in a multi-RATs carrier aggregation system to efficiently utilize a radio spectrum. For example, a wireless communication system may operate using a fifth generation 5G RAT and a 5G RAT. The 5G RAT may utilize different portions of the radio spectrum than the 6G RAT. In some examples, the 6G RAT may use some relatively higher frequencies of the radio spectrum than the 5G RAT. For example, the 5G RAT may use low band and up to mid-band frequencies (e.g., less than 1 GHz and up to mmW frequencies) while the 6G RAT may use low band and up to sub-terahertz (sub-THz) frequencies (e.g., less than 1 GHz to greater than 1 THz). In such examples, the bands suitable for wide-area coverage may be allocated to the 5G RAT. However, the 6G RAT may benefit from these bands, and thus, may benefit from a multi-RAT spectrum sharing, which involves multiple RATs sharing portions of the spectrum otherwise allocated for a particular RAT. For example, a 5G UE 115 (e.g., 5G legacy UE 115) may use spectrum frequencies allocated for the 5G RAT and a 6G UE 115 may aggregate 5G and 6G spectrum to use frequencies allocated for both the 5G RAT and the 6G RAT.

In some examples, communications over the higher frequencies of the spectrum may be relatively less reliable than lower frequencies of the spectrum (e.g., due to attenuation losses over larger distances). Accordingly, to ensure successful communications for the 6G RAT, such as for DCI, the 6G RAT may expand spectrum usage to include lower frequencies of the radio spectrum, which are used by the 5G RAT. In such cases, a 5G DCI and a 6G DCI may be transmitted over a 5G PDCCH. However, distinguishing between a 5G DCI and a 6G DCI that is transmitted by the 5G PDCCH may be difficult.

As discussed herein, a UE 115 may receive a DCI for a 5G RAT (e.g., first RAT) or a 6G RAT (e.g., second RAT) in a downlink control channel (e.g., a PDCCH) communicated via the 5G RAT. The UE 115 may communicate via the 6G RAT based on receiving the DCI. In particular, the UE 115 may determine whether the DCI is associated with the 5G RAT or the 6G RAT using DCI monitoring, and then communicate with the 6G RAT based on the determination. To determine whether the DCI is associated with the 5G RAT or the 6G RAT in the DCI monitoring, the UE 115 may monitor different search spaces, different CORESETs, different RNTIs, different DCI lengths, different indication fields of the DCI, different capability parameters, or wake-up signals, that are associated with the downlink control channel communicated via the 5G RAT.

Accordingly, the UE 115 may receive the DCI for the 6G RAT using control signaling for the 5G RAT. DCI monitoring when using the 5G RAT to receive the 6G RAT DCI may facilitate a smoother transition between the RATs and may also increase reliability in communicating DCI. Moreover, DCI monitoring for 6G DCI and 5G DCI may increase DCI functionality in the 5G RAT with minimal or no impact to the 5G RAT. To facilitate carrier aggregation and a migration to multi-RAT spectrum sharing, the network entity 105 may assign respective PDCPs, RLC layers, MAC layers, and PHY layers (e.g., 5G High PHY, 5G Low PHY, 6G High PHY, and 6G Low PHY) for the 5G and 6G RATs. In some examples, the UE 115 may use a 5G PHY for the 5G RAT and a 6G PHY for the 6G RAT (e.g., rather than high and low PHYs).

Figure 2:
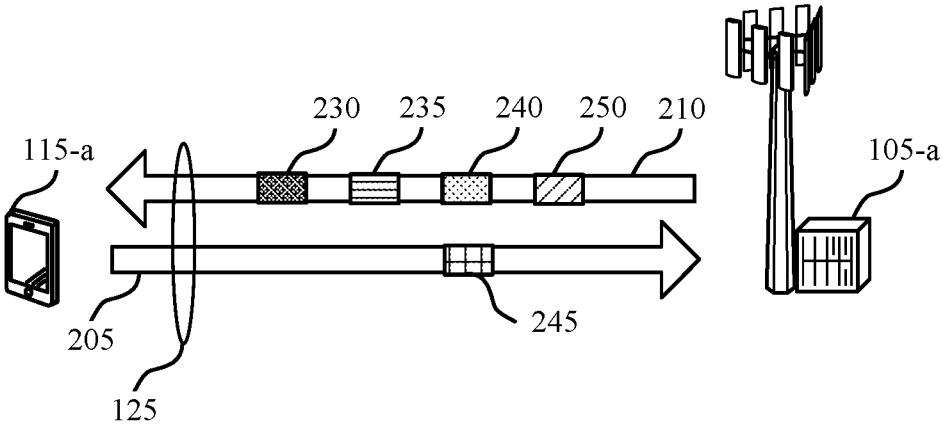
FIG. 2 shows an example of a wireless communications system that supports control information for multiple radio access technology carrier aggregation in accordance with one or more aspects of the present disclosure.

FIG. 2 shows an example of a wireless communications system 200 that supports control information for multiple radio access technology carrier aggregation in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 described with respect to FIG. 1. The wireless communications system 200 also includes a network entity 105-a, which may be an example of a network entity 105 as described with respect to FIG. 1.

The network entity 105-a may communicate with the UE 115-a using a communication link 125. The communication link 125 may be an example of an NR or LTE link between the UE 115-a and the network entity 105-a. The communication link 125 may include a bi-directional link that enables both uplink and downlink communications. For example, the UE 115-a may transmit uplink signals 205 (e.g., uplink transmissions), such as uplink control signals or uplink data signals, to the network entity 105-a using the communication link 125 and the network entity 105-a may transmit downlink signals 210 (e.g., downlink transmissions), such as downlink control signals or downlink data signals, to the UE 115-a using the communication link 125.

The network entity 105-a and the UE 115-a may be configured to communicate with each other via multiple RATs concurrently (e.g., a first RAT such as 5G and a second RAT such as 6G). The 6G RAT may coexist with the 5G RAT in devices having 5G features, which may be associated with relatively longer product time spans than cellular mobile devices (e.g., 6G devices). To ensure bandwidth for downlink (DL) grants, uplink (UL) grants, or both, in the 6G RAT, which uses high frequency bands, the 6G RAT may also use lower frequency bands (otherwise used for the 5G RAT). For example, 6G DCI may be carried in 5G PDCCH for multi-RAT carrier aggregation and a UE 115 may differentiate between 6G DCI and 5G DCI based on different search spaces or different CORESETs, different RNTIs or different DCI lengths, dedicated bits in DCI for explicit indication, one 5G carrier associated with multiple 6G carriers, different capability parameters (e.g., one or more sets of N1 and N2, and one or more sets of K0, K1, and K2 based on the 6G DCI carried in 5G PDCCH), or 5G PDCCH to wake up a 6G radio of the UE 115. DCI monitoring when using the first RAT to receive the second RAT DCI may facilitate a smoother transition between the RATs may increase reliability in communicating DCI. Moreover, DCI monitoring for 6G DCI and 5G DCI may increases DCI functionality in the 5G RAT with minimal or no impact to the 5G RAT. For example, the DCI monitoring techniques described herein may cause minimal to no impact on the 5G RAT (e.g., 5G NR RAT) since the DCI monitoring is a black box monitoring. Additional evolution of the 6G RAT to include more functionalities with respect to the DCI may also cause minimal to no impact to the 5G RAT.

In some examples, the UE 115 may blindly detect 5G PDCCH but may not blindly detect 6G DCI in 6G bands (e.g., 6G PDCCH). In the 5G bands, the UE 115 may monitor the 5G PDCCH with an algorithm for legacy blind detection. The multi-RAT carrier aggregation discussed herein may involve a UE 115 receiving DCI through one 5G carrier and one or more 6G carriers, and may allow cross carrier scheduling using a 5G PDCCH in the 5G carrier to schedule a physical downlink shared channel (PDSCH) or a physical uplink shared channel (PUSCH) in the 6G carriers. The 6G DCI carried in the 5G PDCCH may not impact the 5G RAT. In some examples, when the UE 115 detects 6G DCI carried in 5G PDCCH, the contents of the DCI may be forwarded for a 6G DCI parsing function of the UE 115 for processing. In some examples, the UE 115 may blindly detect 5G PDCCH but may not blindly detect 6G DCI in 6G bands (6G PDCCH), which may be associated with a higher coverage layer than 5G bands and may be associated with relatively lower reliability than 5G bands. In the 5G bands, the UE 115 may monitor the 5G PDCCH with an algorithm that limits legacy blind detection complexity.

In some examples, the network entity 105-a may transmit signaling for a monitoring configuration 230 for the UE 115-a. For example, the network entity 105-a may configure the UE 115-a to monitor for 5G DCI or the 6G DCI in the 5G PDCCH. The monitoring configuration 230 may configure the UE 115-a to monitor for the DCI based on one or more differentiation schemes, as discussed with respect to FIGS. 3-7. For example, the UE 115-a may be configured to monitor different search spaces, different CORESETs, different RNTIs, different DCI lengths, different indication fields of the DCI, different capability parameters, and/or wake-up signals, that are associated with the DCI and communicated via the 5G RAT. Accordingly, the network entity 105-a may transmit 5G and/or 6G DCI 235 to the UE 115-a using control signaling for the 5G RAT.

In some examples, the network entity 105-a may transmit signaling requesting a capability report 240. The UE 115-a may differentiate the 5G PDCCH scheduling the 5G RAT carrier from the 5G PDCCH scheduling the 6G RAT carrier by different capabilities. In such examples, the different search spaces of the same CORESET may overlap, or the search space may be the same for both carriers. Accordingly, the capabilities for respective RATs may be used for differentiating. The network entity 105-a may configure one or more sets of capabilities to the UE 115-a based on a capability report from the UE 115-a. The capabilities may include a processing procedure time for the DCI, a preparation procedure time for the DCI, or a timing gap, as discussed with respect to FIG. 7.

The UE 115-a may transmit signaling indicating the capability report 245. The capability report may indicate one or more sets of procedure durations for 6G DCI (e.g., one or more sets of processing or procedure times, such as NI or N2). The network entity 105-a may configure one or more sets of parameters (e.g., one or more sets of offsets, such as K0, K1, K2) to the UE 115-a based on the capability report.

Figure 7:
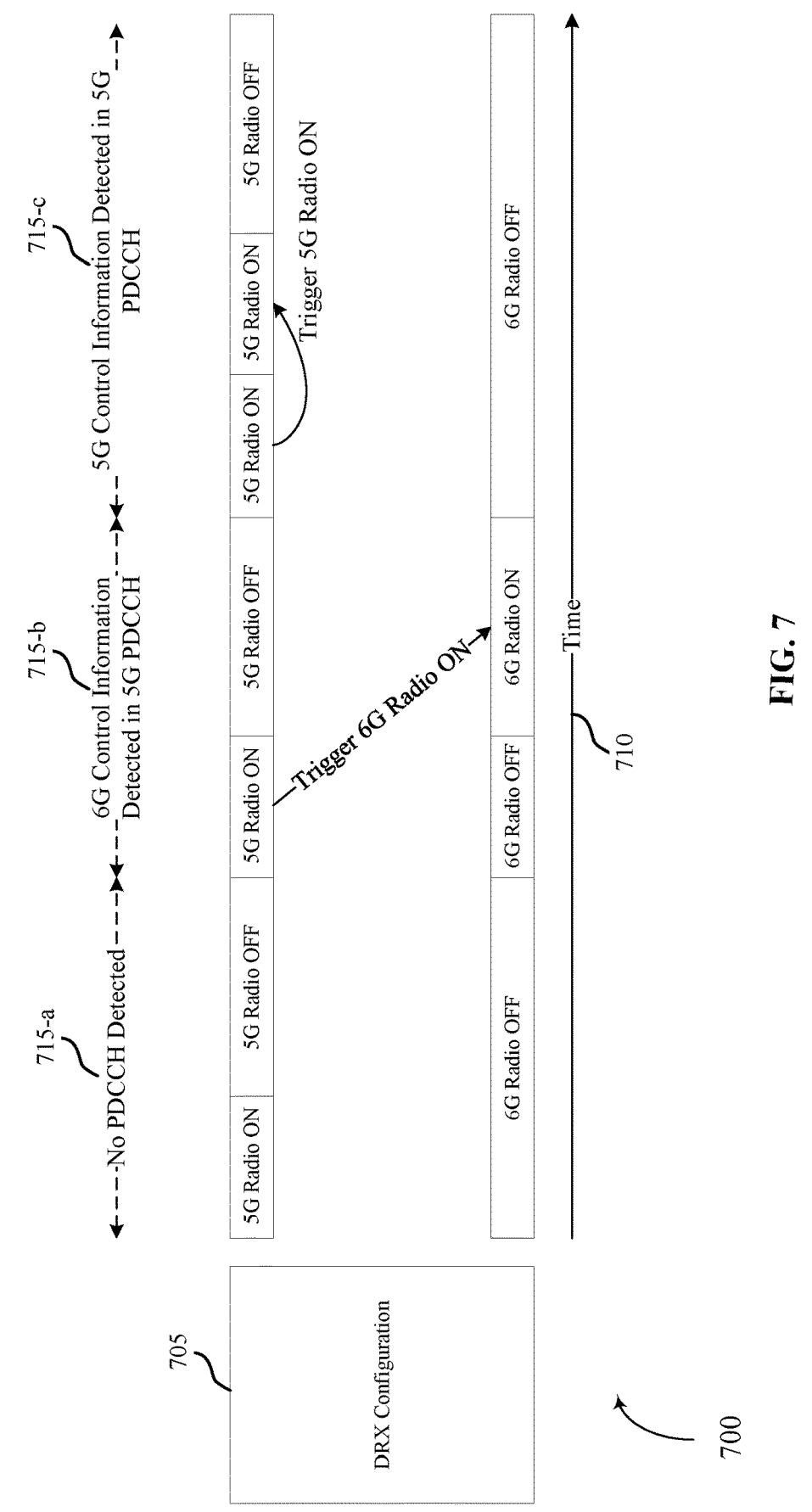
FIG. 7 shows an example of a wake-up radio signal monitoring that supports control information for multiple radio access technology carrier aggregation in accordance with one or more aspects of the present disclosure.

In some examples, the network entity 105-a may transmit signaling for a discontinuous reception (DRX) configuration 250, as discussed with respect to FIG. 7. The UE 115-a may be configured with a DRX period for multi-RAT spectrum sharing or multi-RAT carrier aggregation. During a DRX ON period, the UE 115 may active a 5G radio and associated 5G integrated circuitry (IC) of the UE 115 to monitor the 5G PDCCH. During this DRX ON period, a 6G radio that operates in 6G bands and associated 6G IC of the UE 115 may be in a sleep mode (e.g., low-power state or deactivated). The UE 115 may detect a payload of the 5G PDCCH during the DRX ON period. If the payload is associated with 5G DCI, then the UE 115 may perform a legacy 5G DRX procedure. If the payload is associated with 6G DCI, then the 6G radio (e.g., 6G radio or 6G IC) may be triggered to wake up.

Figure 3:
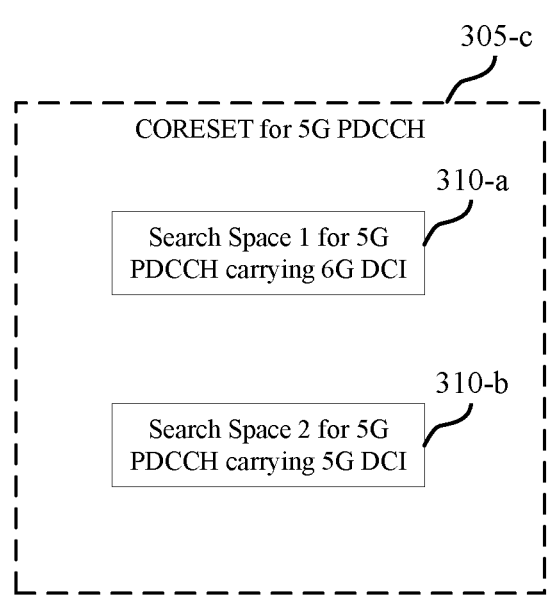
FIG. 3 shows an example of a control resource set or search space monitoring that supports control information for multiple radio access technology carrier aggregation in accordance with one or more aspects of the present disclosure.
Figure 3:
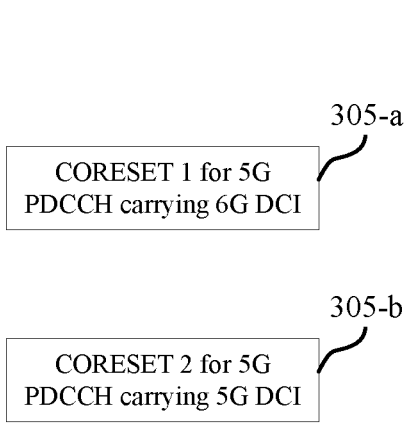

FIG. 3 shows an example of resource monitoring 300 that supports control information for multiple radio access technology carrier aggregation in accordance with one or more aspects of the present disclosure. In this differentiation scheme of resource monitoring 300, the 5G PDCCH scheduling 6G carrier and the 5G PDCCH scheduling 5G carrier may be differentiated by different search spaces or by different CORESETs. For example, the UE 115 may monitor a first CORSET 305-a (CORESET 1) for PDCCH carrying 6G DCI or the UE 115 may monitor a second CORESET 305-b (CORESET 2) for PDCCH carrying 5G DCI. Each of the first CORESET 305-a and the second CORESET 305-b are communicated via the 5G RAT.

In some examples, the UE 115 may monitor for the 5G and 6G DCIs in the 5G PDCCH via different search spaces 310 of the same CORESET 305. For example, a third CORESET 305-c may include a first search space 310-a and a second search space 310-b. The UE 115 may monitor the first search space 310-a for 5G PDCCH carrying 6G DCI or the second search space 310-b for 5G PDCCH carrying 5G DCI. The first search space 310-a may correspond to the first RAT and the second search space 310-b may correspond to the second RAT. In such examples, the UE 115 may blindly detect PDCCH carrying 5G DCI or 6G DCI in the respective search spaces 310.

In such examples, the impact to a 5G UE 115 (e.g., 5G legacy UE 115 communicating using the 5G RAT) may be limited since the UE 115 may not be configured for any CORESET 305 or search space 310 for 5G PDCCH that carries 6G DCI. In some examples, resources may be allocated for the 5G PDCCH carrying 6G DCI, which may result in some overhead for resource allocation in order to indicate to the UE 115 that the DCI is for the 6G RAT.

Figure 4:
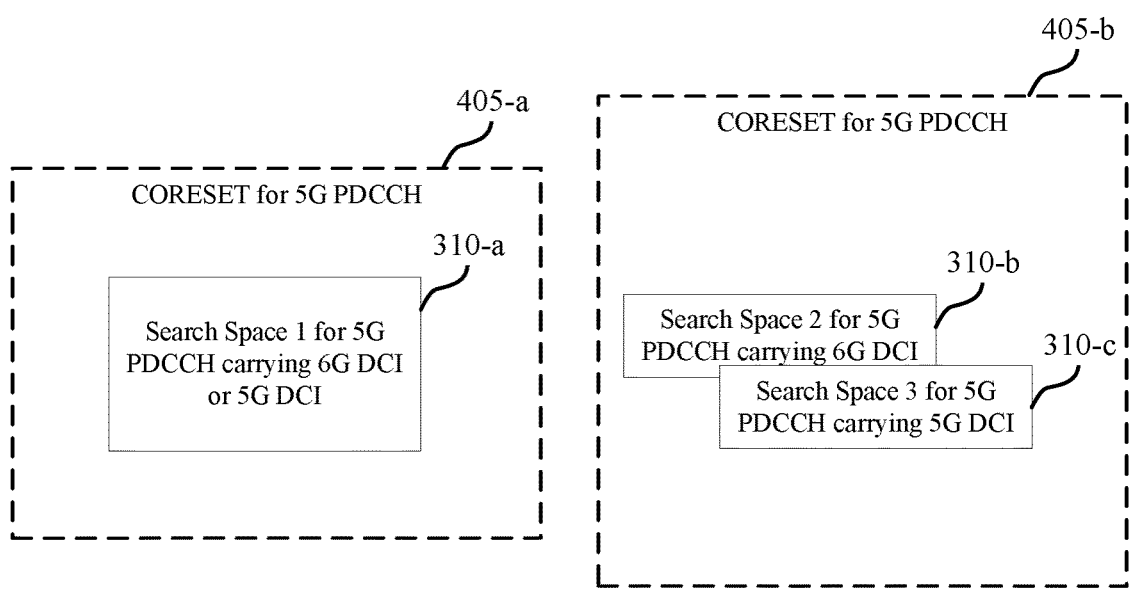
FIG. 4 shows an example of a radio network temporary identifier or DCI length monitoring that supports control information for multiple radio access technology carrier aggregation in accordance with one or more aspects of the present disclosure.
Figure 4:
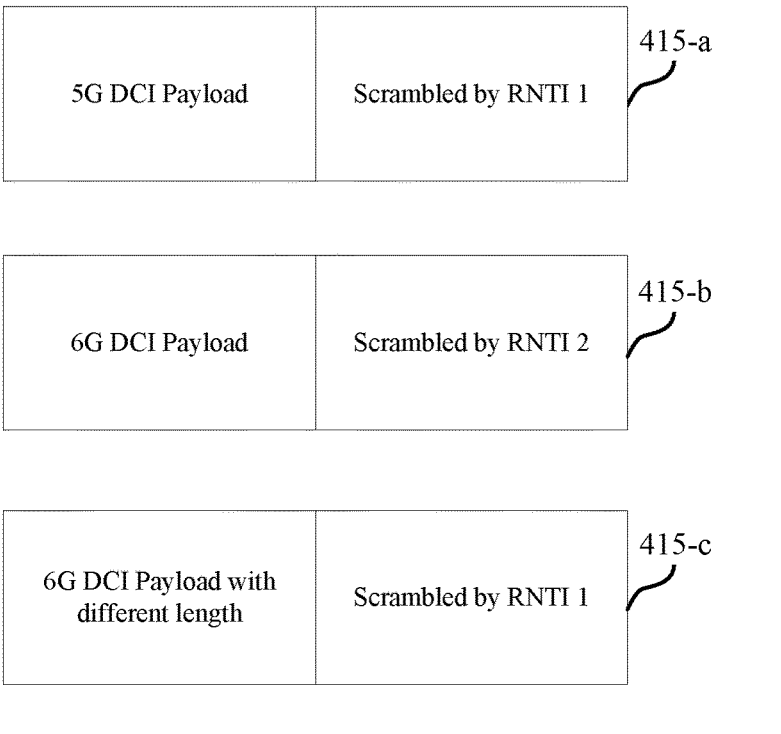

FIG. 4 shows an example of a RNTI or DCI length monitoring 400 that supports control information for multiple radio access technology carrier aggregation in accordance with one or more aspects of the present disclosure. In this differentiation scheme of RNTI or DCI length monitoring 400, the 5G PDCCH scheduling 6G DCI and the 5G PDCCH scheduling 5G DCI may be differentiated by different RNTIs or different DCI lengths. In some examples, a same first CORESET 405-a may include a first search space 310-a for 5G PDCCH carrying both the 5G DCI and the 6G DCI. As such, differentiating between the 5G DCI and the 6G DCI based on CORESETs or search spaces may be difficult. In some examples, a same second CORESET 405-b may include both a second search space 310-b for 5G PDCCH carrying 6G DCI and a third search space 310-c for 5G PDCCH carrying 5G DCI. In some examples, the second search space 310-b and the third search space 310-c may overlap, and thus, differentiating between the 5G DCI and the 6G DCI based on search spaces (that are overlapping) may be difficult.

Accordingly, in such examples involving overlapping search spaces or a same search space for the PDCCH carrying the 5G DCI and the 6G DCI, the UE 115 may differentiate using RNTIs and/or DCI lengths. For example, a first DCI payload 415-a may be scrambled by a first RNTI (RNTI #1) and a second DCI payload 415-b may be scrambled by a second RNTI (RNTI #2), which is a different RNTI than the first RNTI. The RNTIs may be indicative of the RAT. In this example, the first RNTI may correspond to the 5G RAT, indicating that the first DCI payload 415-a is a 5G DCI payload. The second RNTI-b may correspond the 6G RAT, indicating that the second DCI payload 415-b is a 6G DCI payload.

In some examples, DCI lengths may correspond to different RATs so that a DCI length is indicative of a particular RAT. In such examples, the same RNTI may be used to scramble the 5G DCI and the 6G DCI and the UE 115 may use the length of the DCI to determine whether the DCI is a 5G DCI or a 6G DCI. In some cases, however, a 5G DCI may be scrambled using a first RNTI and may have a first length and a 6G DCI may be scrambled using a second RNTI (different than the first RNTI) and may have a second length (different than the first length). A third payload 415-c may also be scrambled with the first RNTI. However, the third payload 415-c may be associated with a particular DCI length that corresponds to the 6G RAT. As such, the UE 115 may use the DCI length to distinguish the third payload 415-c and to determine that the DCI payload is associated with the 6G RAT. The network entity 105 may indicate to the UE 115 the monitoring configuration, such as to monitor and differentiate based on different DCI lengths or different RNTIs.

In some examples, the configuration may also indicate a priority for multiple monitoring schemes. For example, the UE 115 may be configured to monitor and differentiate based on RNTIs or DCIs, and differentiating using DCI lengths may be prioritized over differentiating using RNTIs. In such examples, the UE 115 may identify whether a DCI is for the 5G RAT or the 6G RAT based on the DCI length rather than the RNTI. In some examples, the overhead resource usage for a CORESET may use less overhead resources than of multiple CORESETs or multiple search spaces (as described with respect to FIG. 3), or the same usage as the overhead resource usage of legacy 5G UE 115. However, in some examples, additional RNTIs may be reserved for scrambling 6G DCI that is carried in the 5G PDCCH. The UE 115 may monitor for the additional RNTIs, resulting in increased blind detection complexity at the UE 115

Figure 5:
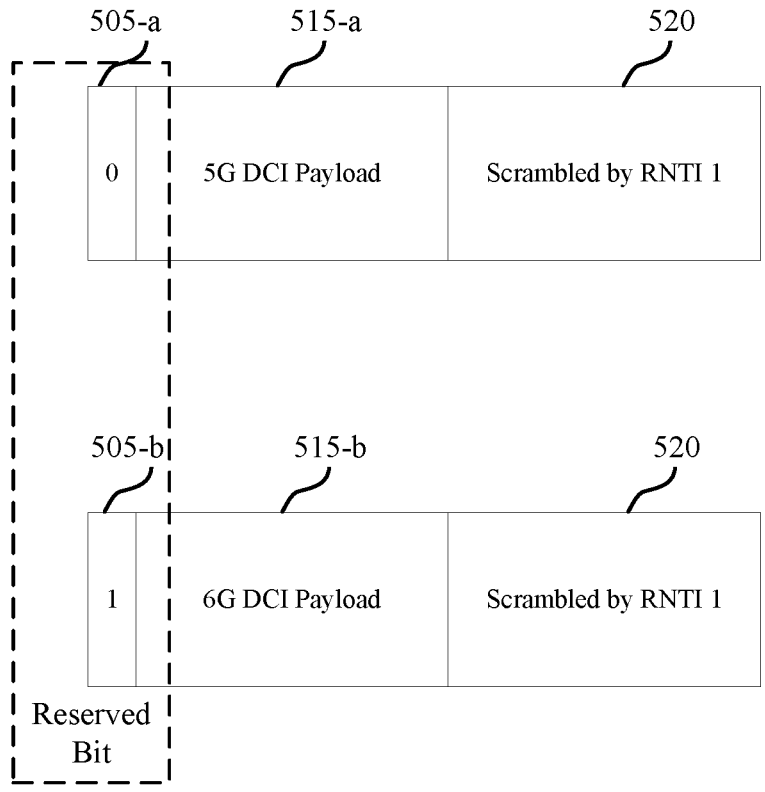
FIG. 5 shows an example of a reserved bit monitoring that supports control information for multiple radio access technology carrier aggregation in accordance with one or more aspects of the present disclosure.

FIG. 5 shows an example of a reserved bit monitoring 500 that supports control information for multiple radio access technology carrier aggregation in accordance with one or more aspects of the present disclosure. In this differentiation scheme of a reserved bit monitoring 500, the 5G PDCCH scheduling 6G carrier and the 5G PDCCH scheduling 5G carrier may be differentiated by a dedicated bit in DCI for explicit indication. A first DCI payload 515-*a* may be scrambled with an RNTI 520 (RNTI 1) and a second DCI payload 515-*b* may be scrambled with the same RNTI 520. As such, differentiating between the 5G DCI and the 6G DCI based on RNTIs 520 may be difficult. Accordingly, in such examples involving payloads 515 that are scrambled with the same RNTIs 520, the UE 115 may differentiate using a reserved bit 505 in the DCI. For example, the first DCI payload 515-*a* may include a first bit 505-*a*, bit 0, and the second DCI payload 515-*b* may include a second bit 505-*b*, bit 1, which is a different bit than the first bit 505-*a*. The reserved bit 505 in the 5G DCI may be used to indicate whether the DCI carried by the 5G PDCCH is a 5G DCI or 6G DCI.

In this manner, the overall 5G PDCCH blind detection may be used, but a 5G DCI parsing function of the UE 115 may be unable to interpret the payload of the 5G PDCCH. If the 5G PDCCH carrying 6G DCI is transmitted in a common search space (CSS), then the 5G UE 115 may also be able to detect the PDCCH but may be unable to interpret the payload of the PDCCH. For example, a 5G UE 115 may not use PDCCH that is for 6G paging. That is, the 5G UE 115 may "PDCCH skip" or perform a "search space set group switching," such that the 5G UE 115 is configured to skip channel estimation and blind decoding for 6G DCI carried in 5G PDCCH. PDCCH skipping for 6G DCI may conserve power at the 5G UE 115.

Figure 6:
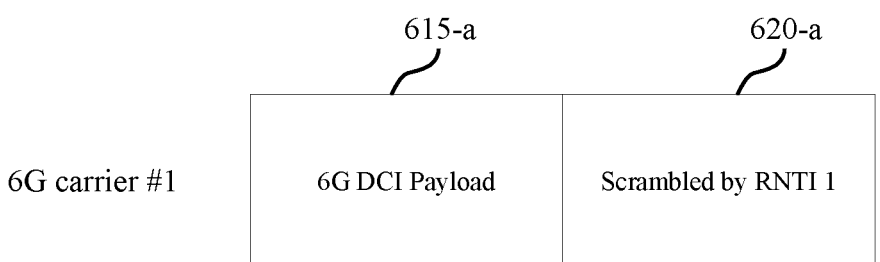
FIG. 6 shows an example of a carrier indication field monitoring that supports control information for multiple radio access technology carrier aggregation in accordance with one or more aspects of the present disclosure.
Figure 6:
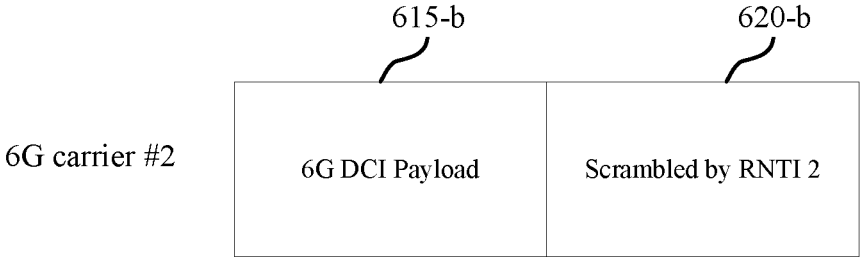
Figure 6:
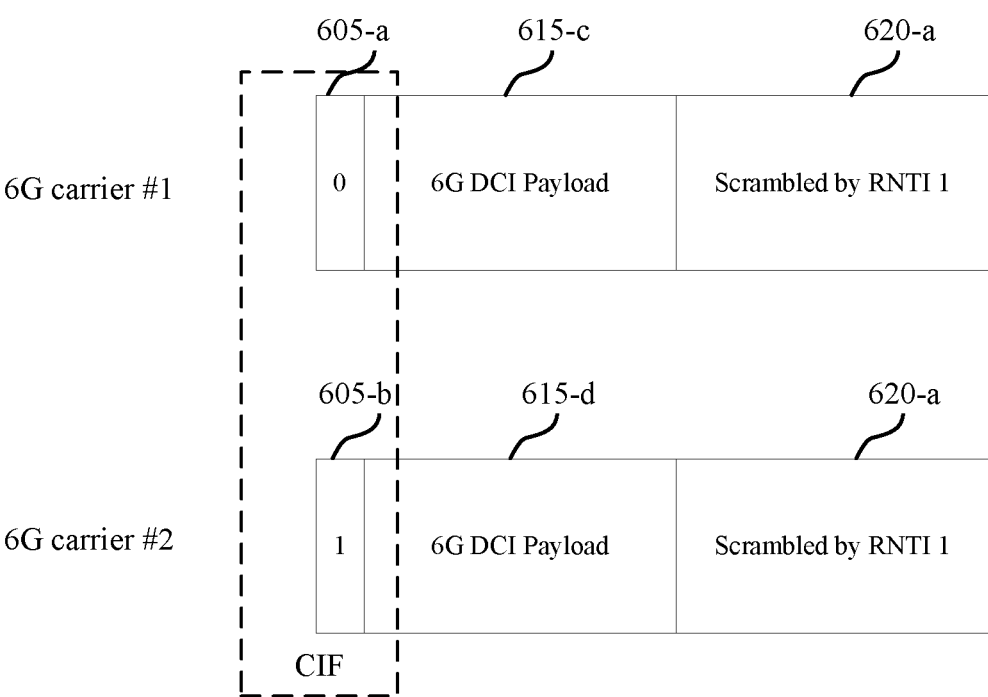
Figure 6:

FIG. 6 shows an example of a carrier indication field (CIF) monitoring 600 that supports control information for multiple radio access technology carrier aggregation in accordance with one or more aspects of the present disclosure. In this differentiation scheme, DCIs for different 6G carriers may be differentiated. In other examples described, techniques were described for distinguishing between a 5G DCI and a 6G DCI communicated via a 5G control channel. The CIF monitoring 600 provides techniques for distinguishing between a first 6G DCI for a first 6G carrier communicated via a 5G control channel and a second 6G DCI for a second 6G carrier communicated via the 5G control channel. In some examples, a single 5G carrier may be aggregated with multiple 6G carriers (e.g., via carrier aggregation). In such examples, the association between the different 6G DCIs carried by the 5G PDCCH for the different 6G carriers may be determined by different RNTIs and/or different explicit fields (e.g., CIFs).

A first 6G DCI payload 615-*a* may be associated with a first 6G carrier (6G carrier #1) and a second 6G DCI payload 615-*b* may be associated with a second 6G carrier (6G carrier #2), and both the first 6G DCI payload 615-*a* and the second 6G DCI payload 615-*b* may be communicated via a 5G carrier (e.g., 5G PDCCH). In such examples, different RNTIs 620 associated with the 6G DCI payloads 615 may be used for differentiating the 6G carriers. For example, the first 6G DCI payload 615-*a* may be scrambled by a first RNTI 620-*a* and the second 6G DCI payload 615-*b* may be scrambled by a second RNTI 620-*b*, which is a different RNTI than the first RNTI 620-*a*. The RNTIs 620 may be indicative of the 6G carrier. In this example, the first RNTI 620-*a* may correspond the first 6G carrier, indicating that the first 6G DCI payload 615-*a* is associated with the first 6G carrier. The second RNTI 620-*b* may correspond to the second 6G carrier, indicating that the second 6G DCI payload 615-*b* is associated with the second 6G carrier.

Additionally, or alternatively to the different RNTIs 620 indicating the different 6G carriers associated with the single 5G carrier for the 5G PDCCH, different fields 605 of the DCI may be used (e.g., a CIF). A third DCI payload 615-*c* may be scrambled with a first RNTI 520 (RNTI 1) and a fourth DCI payload 615-*d* may be scrambled with the same RNTI 520. As such, differentiating between the 6G carriers based on RNTIs 520 may be difficult. Accordingly, in such examples involving 6G payloads 615 associated with multiple 6G carriers that are scrambled with the same RNTI 620, the UE 115 may differentiate using a field 605 in the DCI. For example, the third DCI payload 615-*c* may include a first field 605-*a* (e.g., a first CIF), value X, and the fourth DCI payload 615-*d* may include a second field 605-*b* (e.g., a second CIF), value Y, which is a different value than the first field 605-*a*. The first CIF 605-*a* may correspond to the first 6G carrier (6G carrier #1) and the second field 605-*b* may correspond to the second 6G carrier (6G Carrier #2). The fields 605 in the 6G DCIs may indicate whether the 6G DCIs carried by the 5G PDCCH are associated with the first 6G carrier or the second 6G carrier.

In some examples, the network entity 105 may request a capability report from the UE 115 that indicates the capability of one or more sets of procedure times capable of being implemented by the UE 115 to the network entity 105. For example, the one or more sets of procedure times may include N1 and N2. N1 may refer to processing procedure time it takes a UE to communicate via a PDSCH via a second RAT (e.g., 6G) after receiving 6G DCI carried by the 5G PDCCH. In some cases, N1 may refer to a capability of a UE PDSCH process procedure time (for a 6G PDSCH) for 6G DCI carried by 5G PDCCH. N2 may refer to processing procedure time it takes a UE to communicate via a PUSCH via a second RAT (e.g., 6G) after receiving 6G DCI carried by the 5G PDCCH. In some cases, N2 may refer to a capability of a UE PUSCH preparation procedure time for 6G DCI carried by 5G PDCCH.

Based on the capability report, the network entity 105 may configure one or more sets of timing gap values for the UE 115 between receiving the 6G DCI via the 5G RAT and communicating via the 6G RAT scheduled by the 6G DCI. For example, the one or more sets of timing gaps may include K0, K1, and K2. The K0 value may refer to the timing gaps (e.g., quantity of time slots) between receiving the 5G PDCCH and transmitting the 6G PDSCH associated with the 5G PDCCH. The K1 value may refer to the timing gap between receiving the 5G PDSCH and transmitting the uplink control information (UCI) associated with the 5G PDSCH (e.g., quantity of time slots between PDSCH and HARQ ACK/NACK transmission). The K2 value may refer to the timing gap between receiving the 5G PDCCH and transmitting the 6G PUSCH associated with the 5G PDCCH.

In some examples, the 6G UCI may be carried by the 6G physical uplink control channel (PUCCH) or 6G PUSCH. In some examples, the 6G UCI may be carried by the 5G PUCCH or the 5G PUSCH. The 6G UCI may be multiplexed with 5G UCI in a same 5G PUCCH or 5G PUSCH.

In some examples, the numerology of the 5G band and 6G band may be different, the timing gap unit associated with K0, K1, K2 value may be based on the timing unit of the 6G band since the payload processing is performed by the 6G MAC layer. In some examples, the K0, K1, K2 value may be based on the timing unit of the 5G band and fractional values may be used for the K0, K1, K2 values. Processing the cross-RAT or multi-RAT grant may take a relatively longer time than single RAT grants, and the 5G RAT and the 6G RAT may define different processing time capabilities.

FIG. 7 shows an example of a wake-up radio signal monitoring 700 that supports control information for multiple radio access technology carrier aggregation in accordance with one or more aspects of the present disclosure. In the wake-up radio signal monitoring 700, a UE 115 may be configured with a DRX configuration 705 for multi-RAT spectrum sharing or multi-RAT carrier aggregation, and the DRX configuration 705 may cause the UE 115 to activate or deactivate a 5G radio or a 6G radio of the UE 115. During a DRX ON period, the UE 115 may activate (e.g., turn on, enable) a 5G radio or associated 5G IC of the UE 115 to monitor the 5G PDCCH. During the DRX ON period, a 6G radio or associated 6G IC of the UE 115 operating in a 6G band, may be deactivated (e.g., turned off, disabled, or in a sleep mode). Activating the 6G IC may take more power than activating the 5G IC because the radio frequencies communicated via the 6G RAT are higher than the frequencies communicated via the 5G RAT.

During DRX ON time periods 715 over time 710, the 5G radio (e.g., the 5G radio or the 5G IC) may be activated while the 6G radio (e.g., 6G radio or the 6G IC) may be deactivated (at least partially deactivated), but the 6G radio may be activated via a wake-up signal communicated via the 5G RAT. In some examples, during a first DRX ON time period 715-a, 5G PDCCH may not be detected. As such, the 5G radio that is initially turned on at the beginning of the DRX on period, may be turned off because no PDCCH is detected. The 6G radio may remain off. However, during a second DRX ON time period 715-b, 6G DCI may be detected on the 5G PDCCH. Accordingly, the 5G radio that is initially turned on may be turned off while also triggering the 6G radio to wake up. As the 5G radio is turned off from on, the 6G radio is turned on. During a third DRX ON time period 715-c, 5G DCI (e.g., payload) may be detected in the 5G PDCCH and a legacy 5G DRX procedure may be performed. Accordingly, the 5G radio that is initially turned on may remain on while the 6G radio remains off in the DRX ON time period 715. The 5G radio may turn off again after a timer expires and/or 5G DCI is no longer detected.

In some examples, a UE 115 with wakeup radio may be triggered by a wake-up signal to wake up a 5G main radio of the UE 115 to receive 5G PDCCH. Once the payload of the 5G PDCCH is associated with 6G DCI, the wakeup radio may be triggered to wake up a 6G main radio for data reception or transmission. The 6G radio operating in a 5G band may sleep during the DRX ON periods until there is 6G DCI detected in the 5G PDCCH (e.g., sleeping when not in use), facilitating power saving at the UE 115.

Figure 8:
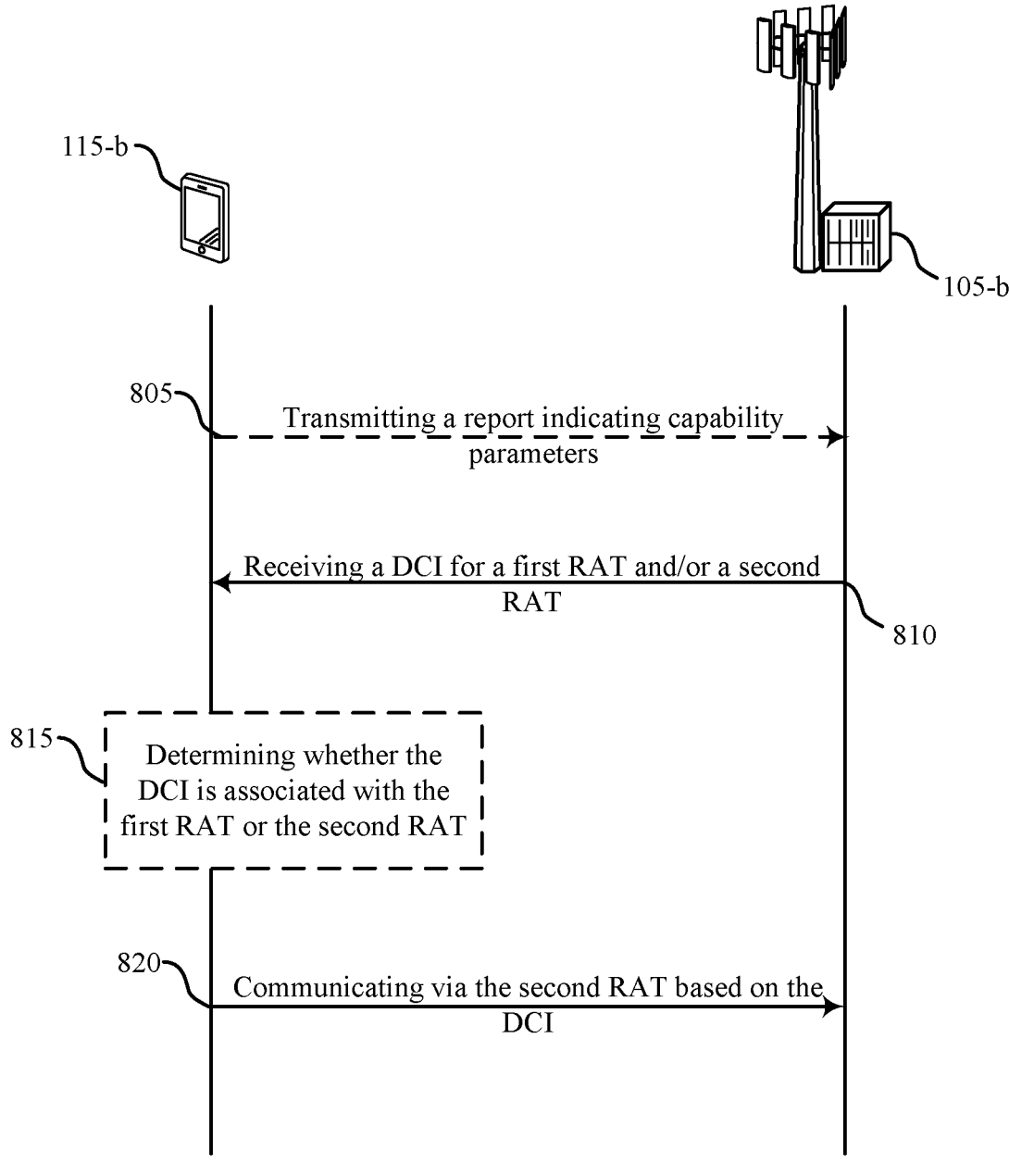
FIG. 8 shows an example of a process flow that supports control information for multiple radio access technology carrier aggregation in accordance with one or more aspects of the present disclosure.

FIG. 8 shows an example of a process flow 800 that supports control information for multiple radio access technology carrier aggregation in accordance with one or more aspects of the present disclosure. The process flow 800 may implement aspects of or may be implemented by aspects of the wireless communications system 100 or the wireless communications system 200. For example, the process flow 800 may include a UE 115-b, which may be an example of a UE 115 as described herein. The process flow 800 may include a network entity 105-b, which may be an example of a network entity 105 as described herein. In the following description of the process flow 800, the operations performed by the network entity 105-b and the UE 115-b may be performed in different orders or at different times than the exemplary order shown. Some operations may also be omitted from the process flow 800, or other operations may be added to the process flow 800. Further, while operations in the process flow 800 are illustrated as being performed by the network entity 105-b and the UE 115-b, the examples herein are not to be construed as limiting, as the described features may be associated with any quantity of different devices.

In some examples, at 805, the UE 115-b may transmit a report indicating one or more capability parameters associated with communicating control information (e.g., DCI) for a second RAT (e.g., 6G). The UE 115-b may receive DCI for the second RAT based at on transmitting the report to the network entity 105-b. The one or more capability parameters may include a timing gap between receiving the DCI via the downlink control channel of a first RAT (e.g., 5G) and communicating via the second RAT. In some examples, the UE 115-b may receive a request for the report indicating the one or more capability parameters, and transmitting the report may be on receiving the request.

At 810, the UE 115-b may receive a DCI for the first RAT, the second RAT, or both, in a downlink control channel (e.g., PDCCH) of the first RAT. In some examples, at 815, the UE 115-b may determine whether the DCI is associated with the first RAT or the second RAT. At 820, the UE 115-b may communicate via the second RAT based on the DCI. In some examples, communicating via the second RAT may be based on determining whether the DCI is associated with the first RAT or the second RAT.

In some examples, the UE 115-b may monitor a first search space of a CORESET for the DCI associated with the first RAT, where the CORESET is associated with the first RAT. The UE 115-b may also monitor a second search space of the CORESET for the DCI associated with the second RAT, where receiving the DCI is based on monitoring the first search space and monitoring the second search space. In some examples, the first search space and the second search spaces may be non-overlapping. In some examples, the first search space and the second search space overlap, and the first search space may be associated with a first RNTI and the second search space may be associated with a second RNTI. In such examples, receiving the DCI may be based on the first RNTI and the second RNTI In some examples, the first search space and the second search space overlap, and the first search space may be associated with a first DCI length and the second search space may be associated with a second DCI length. In such examples, receiving the DCI may be based on the first DCI length and the second DCI length.

In some examples, the UE 115-b may monitor a search space of a CORSET for the DCI, generate a first candidate value of the DCI using a first RNTI associated with the first RAT based on monitoring the search space, and generate a second candidate value of the DCI using a second RNTI associated with the second RAT based on monitoring the search space. In such examples, receiving the DCI may be based on generating the first candidate value and generating the second candidate value.

In some examples, the UE 115-*b* may monitor a first search space of a first CORSET for the DCI associated with the first RAT, where the first CORESET is associated with the first RAT. The UE 115-*b* may monitor a second search space of a second CORESET for the DCI associated with the second RAT, where the second CORESET is associated with the second RAT. In such examples, receiving the DCI may be based on monitoring the first search space and monitoring the second search space.

In some examples, the DCI includes an indication field indicative (e.g., CIF and/or dedicated bit) of whether the DCI is associated with the first RAT or the second RAT. In some examples, receiving the DCI further includes receiving the DCI associated with the second RAT via the first RAT. In such examples, the DCI may include a first RNTI indicative of a first band of the second RAT or a second RNTI indicative of a second band of the second RAT (e.g., indicating a band in multiple 6G bands).

Figure 9:
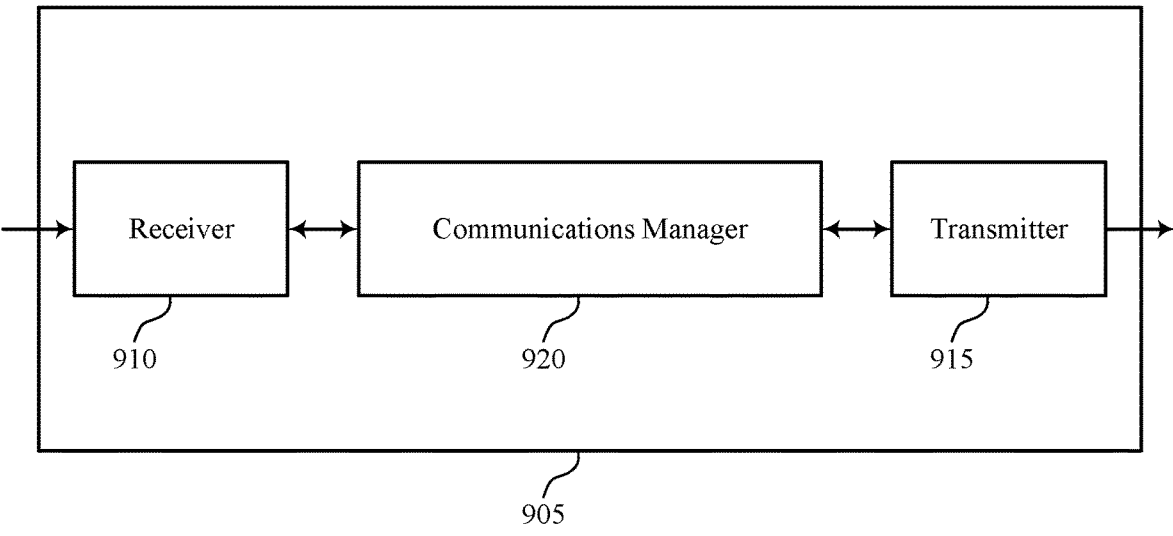
FIGS. 9 and 10 show block diagrams of devices that support control information for multiple radio access technology carrier aggregation in accordance with one or more aspects of the present disclosure.

FIG. 9 shows a block diagram 900 of a device 905 that supports control information for multiple radio access technology carrier aggregation in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to control information for multiple radio access technology carrier aggregation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to control information for multiple radio access technology carrier aggregation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of control information for multiple radio access technology carrier aggregation as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving a downlink control information for a first radio access technology, or a second radio access technology, or both, in a downlink control channel of the first radio access technology. The communications manager 920 is capable of, configured to, or operable to support a means for communicating via the second radio access technology based on receiving the downlink control information.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for a smooth transition between RATs, increases reliability in communicating DCI, as well as increases DCI functionality in the 5G RAT with minimal or no impact to the 5G RAT.

Figure 10:
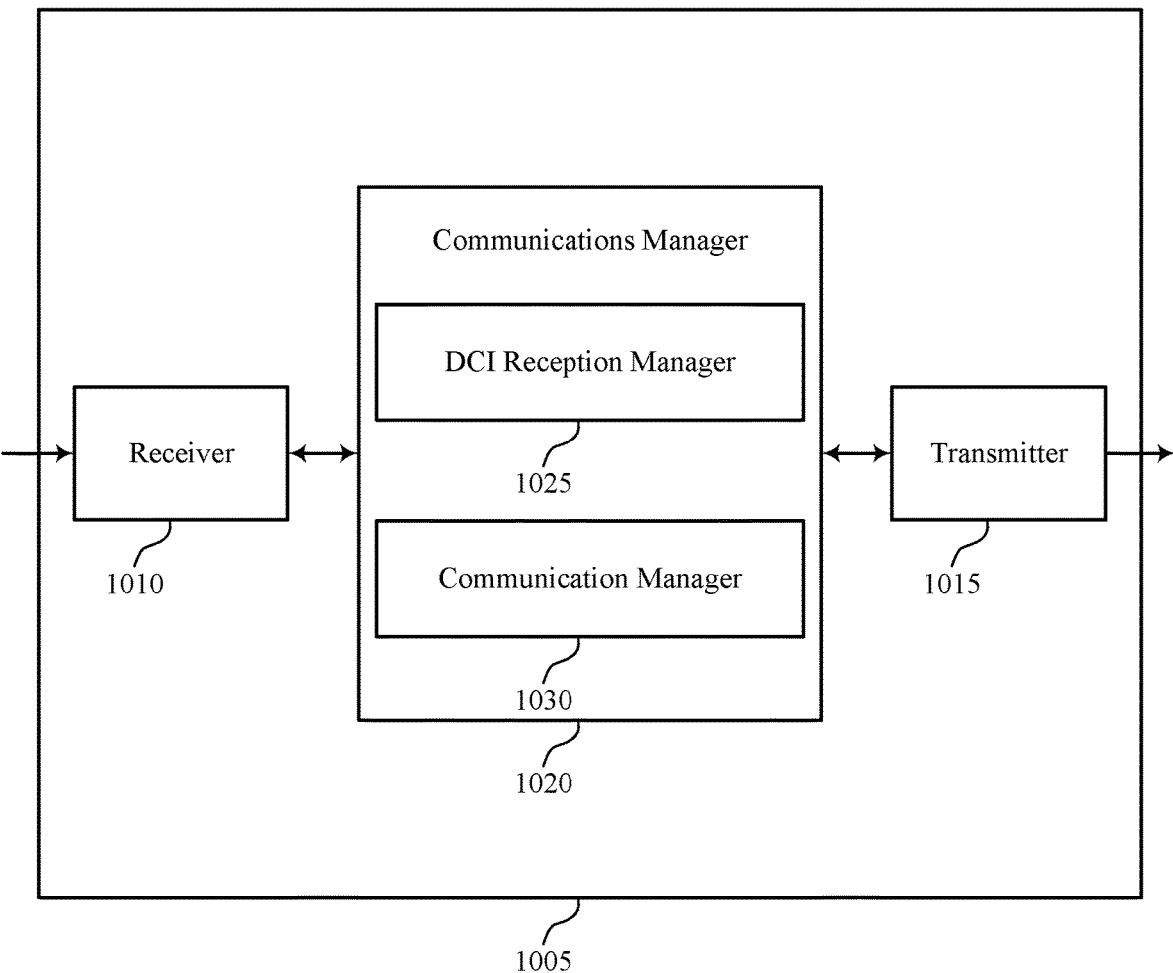

FIG. 10 shows a block diagram 1000 of a device 1005 that supports control information for multiple radio access technology carrier aggregation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to control information for multiple radio access technology carrier aggregation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to control information for multiple radio access technology carrier aggregation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of control information for multiple radio access technology carrier aggregation as described herein. For example, the communications manager 1020 may include a DCI reception manager 1025 a communication manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The DCI reception manager 1025 is capable of, configured to, or operable to support a means for receiving a downlink control information for a first radio access technology, or a second radio access technology, or both, in a downlink control channel of the first radio access technology. The communication manager 1030 is capable of, configured to, or operable to support a means for communicating via the second radio access technology based on receiving the downlink control information.

Figure 11:
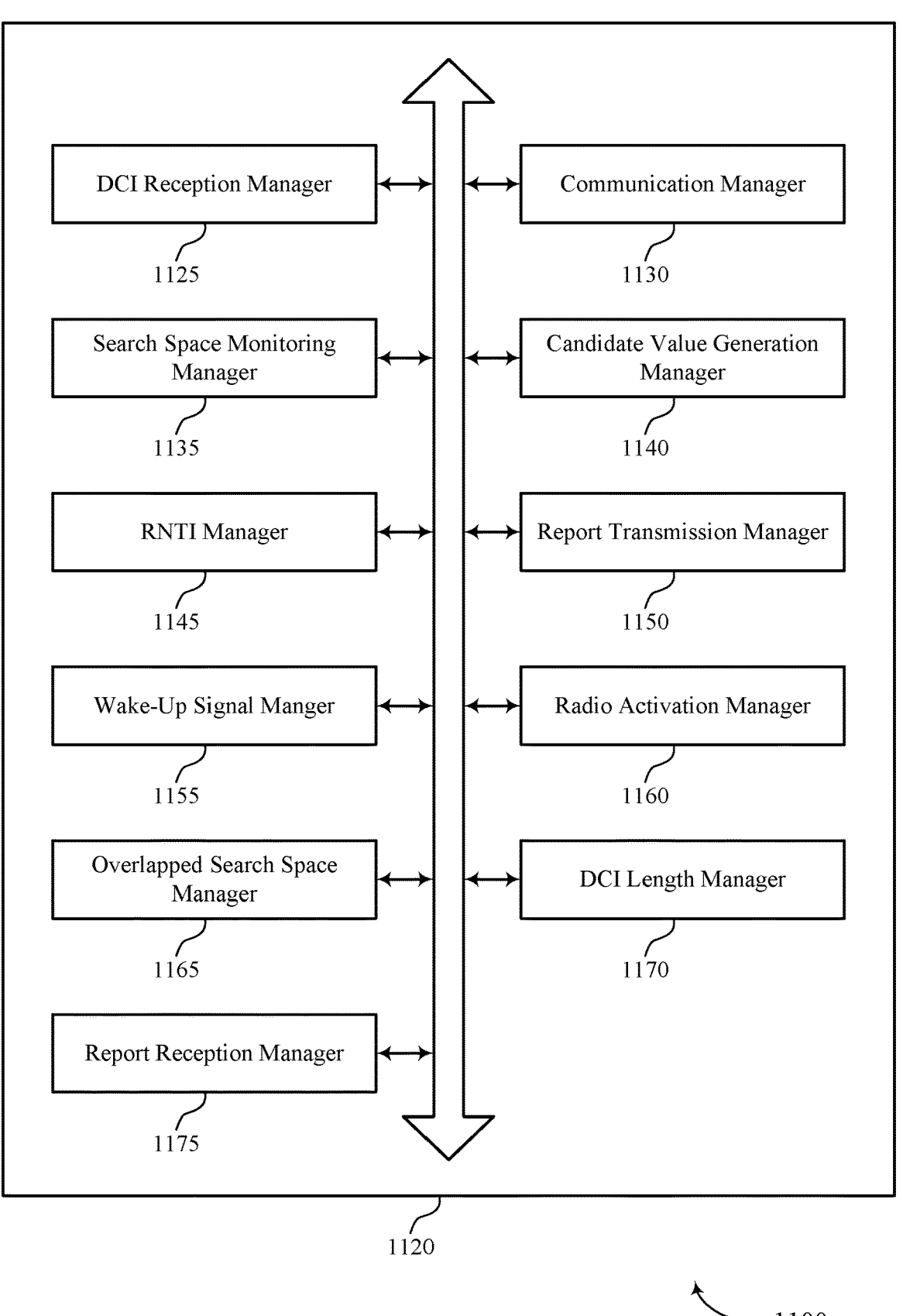
FIG. 11 shows a block diagram of a communications manager that supports control information for multiple radio access technology carrier aggregation in accordance with one or more aspects of the present disclosure.

FIG. 11 shows a block diagram 1100 of a communications manager 1120 that supports control information for multiple radio access technology carrier aggregation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of control information for multiple radio access technology carrier aggregation as described herein. For example, the communications manager 1120 may include a DCI reception manager 1125, a communication manager 1130, a search space monitoring manager 1135, a candidate value generation manager 1140, an RNTI manager 1145, a report transmission manager 1150, a wake-up signal manger 1155, a radio activation manager 1160, an overlapped search space manager 1165, a DCI length manager 1170, a report reception manager 1175, or any combination thereof. Each of these components, or components or subcomponents thereof (e.g., one or more processors, one or more memories), may communicate, directly or indirectly, with one another (e.g., via one or more buses).

The communications manager 1120 may support wireless communications in accordance with examples as disclosed herein. The DCI reception manager 1125 is capable of, configured to, or operable to support a means for receiving a downlink control information for a first radio access technology, or a second radio access technology, or both, in a downlink control channel of the first radio access technology. The communication manager 1130 is capable of, configured to, or operable to support a means for communicating via the second radio access technology based on receiving the downlink control information.

In some examples, the DCI reception manager 1125 is capable of, configured to, or operable to support a means for determining whether the downlink control information is associated with the first radio access technology or the second radio access technology, where communicating via the second radio access technology is based on the determining.

In some examples, the search space monitoring manager 1135 is capable of, configured to, or operable to support a means for monitoring a first search space of a control resource set for the downlink control information associated with the first radio access technology, where the control resource set is associated with the first radio access technology. In some examples, the search space monitoring manager 1135 is capable of, configured to, or operable to support a means for monitoring a second search space of the control resource set for the downlink control information associated with the second radio access technology, where receiving the downlink control information is based on monitoring the first search space and monitoring the second search space.

In some examples, the first search space and the second search space are non-overlapping.

In some examples, the first search space and the second search space overlap. In some examples, the first search space is associated with a first radio network temporary identifier and the second search space is associated with a second radio network temporary identifier, where receiving the downlink control information is based on the first radio network temporary identifier the second radio network temporary identifier.

In some examples, the first search space and the second search space overlap. In some examples, the first search space is associated with a first downlink control information length and the second search space is associated with a second downlink control information length, where receiving the downlink control information is based on the first downlink control information length and the second downlink control information length.

In some examples, the search space monitoring manager 1135 is capable of, configured to, or operable to support a means for monitoring a search space of a control resource set for the downlink control information. In some examples, the candidate value generation manager 1140 is capable of, configured to, or operable to support a means for generating a first candidate value of the downlink control information using a first radio network temporary identifier associated with the first radio access technology based on monitoring the search space. In some examples, the candidate value generation manager 1140 is capable of, configured to, or operable to support a means for generating a second candidate value of the downlink control information using a second radio network temporary identifier associated with the second radio access technology based on monitoring the search space, where receiving the downlink control information is based on generating the first candidate value and generating the second candidate value.

In some examples, the search space monitoring manager 1135 is capable of, configured to, or operable to support a means for monitoring a search space of a control resource set for the downlink control information. In some examples, the candidate value generation manager 1140 is capable of, configured to, or operable to support a means for generating a first candidate value of the downlink control information using a first downlink control information length associated with the first radio access technology based on monitoring the search space. In some examples, the candidate value generation manager 1140 is capable of, configured to, or operable to support a means for generating a second candidate value of the downlink control information using a second downlink control information length associated with the second radio access technology based on monitoring the search space, where receiving the downlink control information is based on generating the first candidate value and generating the second candidate value.

In some examples, the search space monitoring manager 1135 is capable of, configured to, or operable to support a means for monitoring a first search space of a first control resource set for the downlink control information associated with the first radio access technology, where the first control resource set is associated with the first radio access technology. In some examples, the search space monitoring manager 1135 is capable of, configured to, or operable to support a means for monitoring a second search space of a second control resource set for the downlink control information associated with the second radio access technology, where the second control resource set is associated with the second radio access technology, where receiving the downlink control information is based on monitoring the first search space and monitoring the second search space.

In some examples, the downlink control information includes an indication field indicative of whether the downlink control information is associated with the first radio access technology or the second radio access technology.

In some examples, to support receiving the downlink control information, the RNTI manager 1145 is capable of, configured to, or operable to support a means for receiving the downlink control information associated with the second radio access technology via the radio access technology, where the downlink control information includes a first radio network temporary identifier indicative of a first band of the second radio access technology or a second radio network temporary identifier indicative of a second band of the second radio access technology.

In some examples, the report transmission manager 1150 is capable of, configured to, or operable to support a means for transmitting a report indicating one or more capability parameters associated with communicating control information for the second radio access technology, where receiving the downlink control information for the second radio access technology based on transmitting the report.

In some examples, the one or more capability parameters include a timing gap between receiving the downlink control information via the downlink control channel of the first radio access technology and communicating via the second radio access technology.

In some examples, the report reception manager 1175 is capable of, configured to, or operable to support a means for receiving a request for the report indicating the one or more capability parameters, where transmitting the report is based on receiving the request.

In some examples, the wake-up signal manger 1155 is capable of, configured to, or operable to support a means for receiving a wake-up signal via a first radio component associated with the first radio access technology that includes a payload, where the downlink control information that is associated with the second radio access technology is included in the payload. In some examples, the radio activation manager 1160 is capable of, configured to, or operable to support a means for activating a second radio component associated the second radio access technology based on the downlink control information being associated with the second radio access technology.

Figure 12:
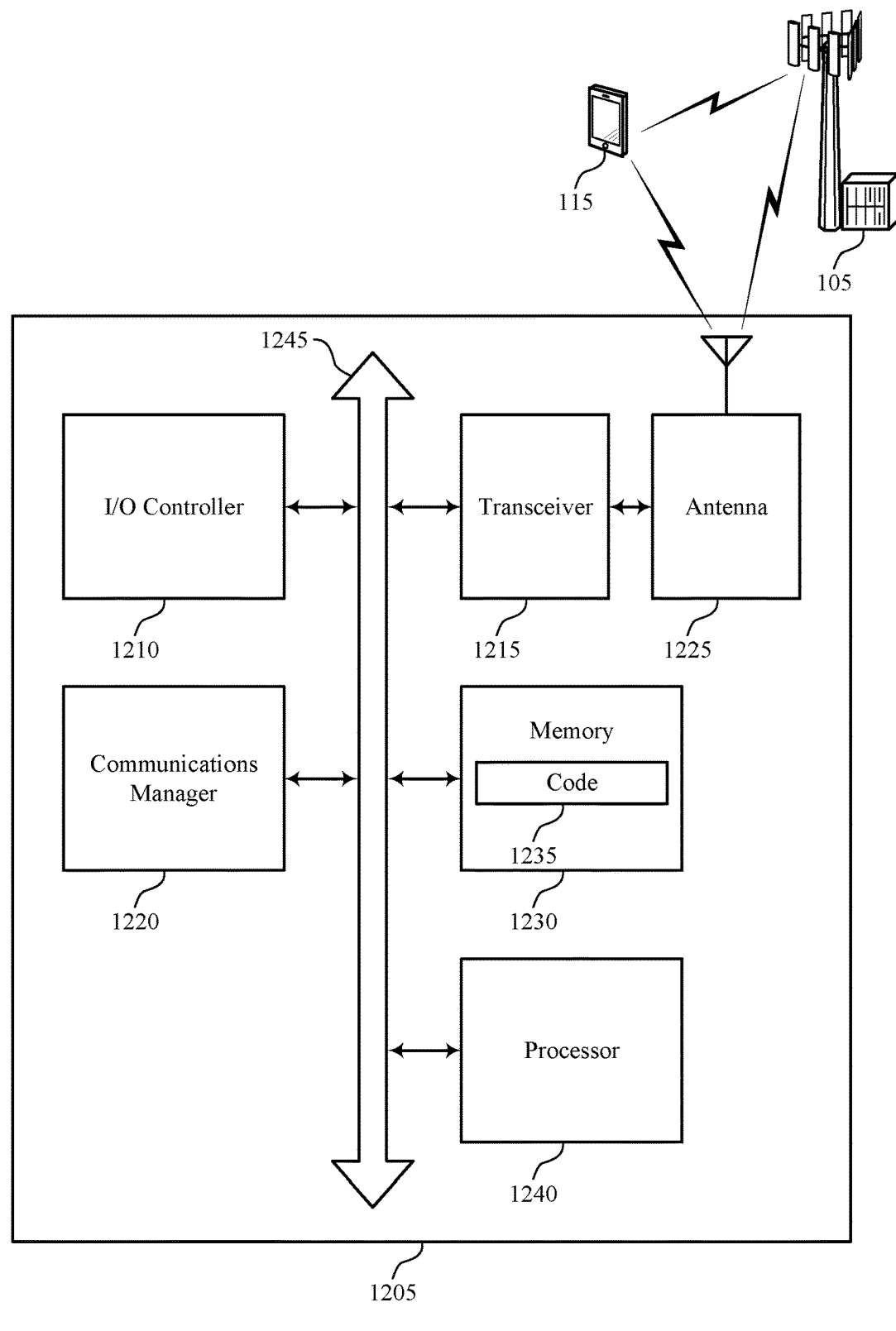
FIG. 12 shows a diagram of a system including a device that supports control information for multiple radio access technology carrier aggregation in accordance with one or more aspects of the present disclosure.

FIG. 12 shows a diagram of a system 1200 including a device 1205 that supports control information for multiple radio access technology carrier aggregation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting control information for multiple radio access technology carrier aggregation). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communications in accordance with examples as disclosed herein. For example, the communications manager 1220 is capable of, configured to, or operable to support a means for receiving a downlink control information for a first radio access technology, or a second radio access technology, or both, in a downlink control channel of the first radio access technology. The communications manager 1220 is capable of, configured to, or operable to support a means for communicating via the second radio access technology based on receiving the downlink control information.

By including or configuring the communications manager 1220 in accordance with examples as described herein, the device 1205 may support techniques for smooth transition between RATs, increases reliability in communicating DCI, as well as increases DCI functionality in the 5G RAT with minimal or no impact to the 5G RAT.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of control information for multiple radio access technology carrier aggregation as described herein, or the at least one processor 1240 and the at least one memory 1230 may be otherwise configured to, individually or collectively, perform or support such operations.

Figure 13:
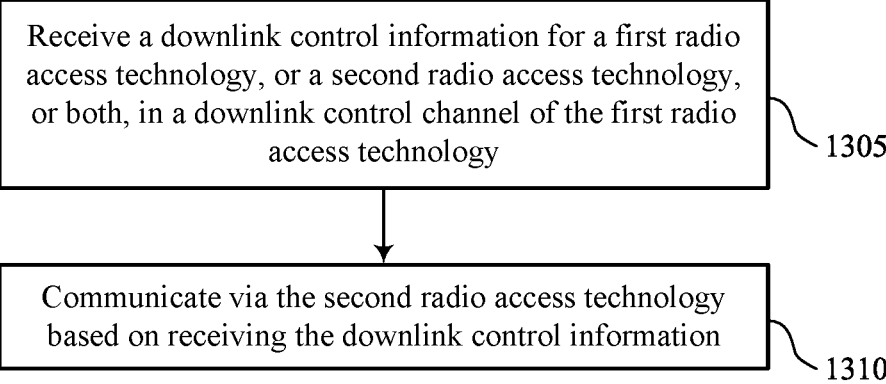

FIG. 13 shows a flowchart illustrating a method 1300 that supports control information for multiple radio access technology carrier aggregation in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving a downlink control information for a first radio access technology, or a second radio access technology, or both, in a downlink control channel of the first radio access technology. The operations of block 1305 may be performed in accordance with examples as disclosed herein. In some examples, aspects of the operations of 1305 may be performed by a DCI reception manager 1125 as described with reference to FIG. 11.

At 1310, the method may include communicating via the second radio access technology based on receiving the downlink control information. The operations of block 1310 may be performed in accordance with examples as disclosed herein. In some examples, aspects of the operations of 1310 may be performed by a communication manager 1130 as described with reference to FIG. 11.

FIG. 14 shows a flowchart illustrating a method 1400 that supports control information for multiple radio access technology carrier aggregation in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include receiving a downlink control information for a first radio access technology, or a second radio access technology, or both, in a downlink control channel of the first radio access technology. The operations of block 1405 may be performed in accordance with examples as disclosed herein. In some examples, aspects of the operations of 1405 may be performed by a DCI reception manager 1125 as described with reference to FIG. 11.

At 1410, the method may include determining whether the downlink control information is associated with the first radio access technology or the second radio access technology, where communicating via the second radio access technology is based on the determining. The operations of block 1410 may be performed in accordance with examples as disclosed herein. In some examples, aspects of the operations of 1410 may be performed by a DCI reception manager 1125 as described with reference to FIG. 11.

At 1415, the method may include communicating via the second radio access technology based on receiving the downlink control information. The operations of block 1415 may be performed in accordance with examples as disclosed herein. In some examples, aspects of the operations of 1415 may be performed by a communication manager 1130 as described with reference to FIG. 11.

FIG. 15 shows a flowchart illustrating a method 1500 that supports control information for multiple radio access technology carrier aggregation in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving a downlink control information for a first radio access technology, or a second radio access technology, or both, in a downlink control channel of the first radio access technology. The operations of block 1505 may be performed in accordance with examples as disclosed herein. In some examples, aspects of the operations of 1505 may be performed by a DCI reception manager 1125 as described with reference to FIG. 11.

At 1510, the method may include communicating via the second radio access technology based on receiving the downlink control information. The operations of block 1510 may be performed in accordance with examples as disclosed herein. In some examples, aspects of the operations of 1510 may be performed by a communication manager 1130 as described with reference to FIG. 11.

At 1515, the method may include monitoring a first search space of a control resource set for the downlink control information associated with the first radio access technology, where the control resource set is associated with the first radio access technology. The operations of block 1515 may be performed in accordance with examples as disclosed herein. In some examples, aspects of the operations of 1515 may be performed by a search space monitoring manager 1135 as described with reference to FIG. 11.

At 1520, the method may include monitoring a second search space of the control resource set for the downlink control information associated with the second radio access technology, where receiving the downlink control information is based on monitoring the first search space and monitoring the second search space. The operations of block 1520 may be performed in accordance with examples as disclosed herein. In some examples, aspects of the operations of 1520 may be performed by a search space monitoring manager 1135 as described with reference to FIG. 11.

The following provides an overview of aspects of the present disclosure:

Aspect 1: A method for wireless communications at a UE, comprising: receiving a downlink control information for a first RAT, or a second RAT, or both, in a downlink control channel of the first RAT; and communicating via the second RAT based at least in part on receiving the DCI.

Aspect 2: The method of aspect 1, further comprising: determining whether the DCI is associated with the first RAT or the second RAT, wherein communicating via the second RAT is based at least in part on the determining.

Aspect 3: The method of any of aspects 1 through 2, further comprising: monitoring a first search space of a CORESET for the DCI associated with the first RAT, wherein the CORESET is associated with the first RAT; and monitoring a second search space of the CORESET for the DCI associated with the second RAT, wherein receiving the DCI is based at least in part on monitoring the first search space and monitoring the second search space.

Aspect 4: The method of aspect 3, wherein the first search space and the second search space are non-overlapping.

Aspect 5: The method of any of aspects 3 through 4, wherein the first search space and the second search space overlap, and the first search space is associated with a first RNTI and the second search space is associated with a second RNTI, wherein receiving the DCI is based at least in part on the first RNTI the second RNTI.

Aspect 6: The method of any of aspects 3 through 5, wherein the first search space and the second search space overlap, and the first search space is associated with a first DCI length and the second search space is associated with a second DCI length, wherein receiving the DCI is based at least in part on the first DCI length and the second DCI length.

Aspect 7: The method of any of aspects 1 through 6, further comprising: monitoring a search space of a CORESET for the DCI; generating a first candidate value of the DCI using a first RNTI associated with the first RAT based at least in part on monitoring the search space; and generating a second candidate value of the DCI using a second RNTI associated with the second RAT based at least in part on monitoring the search space, wherein receiving the DCI is based at least in part on generating the first candidate value and generating the second candidate value.

Aspect 8: The method of any of aspects 1 through 7, further comprising: monitoring a search space of a CORESET for the DCI; generating a first candidate value of the DCI using a first DCI length associated with the first RAT based at least in part on monitoring the search space; and generating a second candidate value of the DCI using a second DCI length associated with the second RAT based at least in part on monitoring the search space, wherein receiving the DCI is based at least in part on generating the first candidate value and generating the second candidate value.

Aspect 9: The method of any of aspects 1 through 8, further comprising: monitoring a first search space of a first CORESET for the DCI associated with the first RAT, wherein the first CORESET is associated with the first RAT; and monitoring a second search space of a second CORESET for the DCI associated with the second RAT, wherein the second CORESET is associated with the second RAT, wherein receiving the DCI is based at least in part on monitoring the first search space and monitoring the second search space.

Aspect 10: The method of any of aspects 1 through 9, wherein the DCI comprises an indication field indicative of whether the DCI is associated with the first RAT or the second RAT.

Aspect 11: The method of any of aspects 1 through 10, wherein receiving the DCI further comprises: receiving the DCI associated with the second RAT via the RAT, wherein the DCI comprises a first RNTI indicative of a first band of the second RAT or a second RNTI indicative of a second band of the second RAT.

Aspect 12: The method of any of aspects 1 through 11, further comprising: transmitting a report indicating one or more capability parameters associated with communicating control information for the second RAT, wherein receiving the DCI for the second RAT based at least in part on transmitting the report.

Aspect 13: The method of aspect 12, wherein the one or more capability parameters comprise a timing gap between receiving the DCI via the downlink control channel of the first RAT and communicating via the second RAT.

Aspect 14: The method of any of aspects 12 through 13, further comprising: receiving a request for the report indicating the one or more capability parameters, wherein transmitting the report is based at least in part on receiving the request.

Aspect 15: The method of any of aspects 1 through 14, further comprising: receiving a wake-up signal via a first radio component associated with the first RAT that includes a payload, wherein the DCI that is associated with the second RAT is included in the payload; and activating a second radio component associated the second RAT based at least in part on the DCI being associated with the second RAT.

Aspect 16: A UE for wireless communications, comprising one or more memories storing processor-executable code, and one or more processors coupled with the one or more memories and individually or collectively operable to execute the code to cause the UE to perform a method of any of aspects 1 through 15.

Aspect 17: A UE for wireless communications, comprising at least one means for performing a method of any of aspects 1 through 15.

Aspect 18: A non-transitory computer-readable medium storing code for wireless communications, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   monitor for a downlink control information for a first radio access technology, or a second radio access technology, or both;
   generate a first candidate value of the downlink control information based at least in part on the first radio access technology based at least in part on the monitoring;
   generate a second candidate value of the downlink control information based at least in part on the second radio access technology based at least in part on the monitoring;
   receive, based at least in part on generating the first candidate value and the second candidate value, the downlink control information for the first radio access technology, or the second radio access technology, or both, in a downlink control channel of the first radio access technology; and
   communicate via the second radio access technology based at least in part on receiving the downlink control information.

2. The UE of claim 1, wherein the one or more processors are individually or collectively further operable to execute the code to cause the UE to:
   determine whether the downlink control information is associated with the first radio access technology or the second radio access technology, wherein communicating via the second radio access technology is based at least in part on the determining.

3. The UE of claim 1, wherein, to monitor for the downlink control information, the one or more processors are individually or collectively further operable to execute the code to cause the UE to:
   monitor a first search space of a control resource set for the downlink control information associated with the first radio access technology, wherein the control resource set is associated with the first radio access technology; and
   monitor a second search space of the control resource set for the downlink control information associated with the second radio access technology, wherein receiving the downlink control information is based at least in part on monitoring the first search space and monitoring the second search space.

4. The UE of claim 3, wherein:

the first search space and the second search space are non-overlapping.

5. The UE of claim 3, wherein:

the first search space and the second search space overlap, and the first search space is associated with a first radio network temporary identifier and the second search space is associated with a second radio network temporary identifier, wherein receiving the downlink control information is based at least in part on the first radio network temporary identifier and the second radio network temporary identifier.

6. The UE of claim 3, wherein:

the first search space and the second search space overlap, and the first search space is associated with a first downlink control information length and the second search space is associated with a second downlink control information length, wherein receiving the downlink control information is based at least in part on the first downlink control information length and the second downlink control information length.

7. The UE of claim 1, wherein, to generate the first candidate value and the second candidate value, the one or more processors are individually or collectively further operable to execute the code to cause the UE to:

monitor a search space of a control resource set for the downlink control information;

generate the first candidate value of the downlink control information using a first radio network temporary identifier associated with the first radio access technology based at least in part on monitoring the search space; and generate the second candidate value of the downlink control information using a second radio network temporary identifier associated with the second radio access technology based at least in part on monitoring the search space.

8. The UE of claim 1, wherein, to generate the first candidate value and the second candidate value, the one or more processors are individually or collectively further operable to execute the code to cause the UE to:

monitor a search space of a control resource set for the downlink control information;

generate the first candidate value of the downlink control information using a first downlink control information length associated with the first radio access technology based at least in part on monitoring the search space; and generate the second candidate value of the downlink control information using a second downlink control information length associated with the second radio access technology based at least in part on monitoring the search space.

9. The UE of claim 1, wherein, to monitor for the downlink control information, the one or more processors are individually or collectively further operable to execute the code to cause the UE to:

monitor a first search space of a first control resource set for the downlink control information associated with the first radio access technology, wherein the first control resource set is associated with the first radio access technology; and monitor a second search space of a second control resource set for the downlink control information associated with the second radio access technology, wherein the second control resource set is associated with the second radio access technology, wherein receiving the downlink control information is based at least in part on monitoring the first search space and monitoring the second search space.

10. The UE of claim 1, wherein the downlink control information comprises an indication field indicative of whether the downlink control information is associated with the first radio access technology or the second radio access technology.

11. The UE of claim 1, wherein, to receive the downlink control information, the one or more processors are individually or collectively further operable to execute the code to cause the UE to:

receive the downlink control information associated with the second radio access technology via the first radio access technology, wherein the downlink control information comprises a first radio network temporary identifier indicative of a first band of the second radio access technology or a second radio network temporary identifier indicative of a second band of the second radio access technology.

12. The UE of claim 1, wherein the one or more processors are individually or collectively further operable to execute the code to cause the UE to:

transmit a report indicating one or more capability parameters associated with communicating control information for the second radio access technology, wherein receiving the downlink control information for the second radio access technology is based at least in part on transmitting the report.

13. The UE of claim 12, wherein the one or more capability parameters comprise a timing gap between receiving the downlink control information via the downlink control channel of the first radio access technology and communicating via the second radio access technology.

14. The UE of claim 12, wherein the one or more processors are individually or collectively further operable to execute the code to cause the UE to:

receive a request for the report indicating the one or more capability parameters, wherein transmitting the report is based at least in part on receiving the request.

15. The UE of claim 1, wherein the one or more processors are individually or collectively further operable to execute the code to cause the UE to:

receive a wake-up signal via a first radio component associated with the first radio access technology that includes a payload, wherein the downlink control information that is associated with the second radio access technology is included in the payload; and activate a second radio component associated with the second radio access technology based at least in part on the downlink control information being associated with the second radio access technology.

16. A method for wireless communications at a user equipment (UE), comprising:

monitoring for a downlink control information for a first radio access technology, or a second radio access technology, or both;

generating a first candidate value of the downlink control information based at least in part on the first radio access technology based at least in part on the monitoring;

generating a second candidate value of the downlink control information based at least in part on the second radio access technology based at least in part on the monitoring;

receiving, based at least in part on generating the first candidate value and the second candidate value, the downlink control information for the first radio access technology, or the second radio access technology, or both, in a downlink control channel of the first radio access technology; and communicating via the second radio access technology based at least in part on receiving the downlink control information.

17. The method of claim 16, further comprising:

determining whether the downlink control information is associated with the first radio access technology or the second radio access technology, wherein communicating via the second radio access technology is based at least in part on the determining.

18. The method of claim 16, wherein monitoring for the downlink control information comprises:

monitoring a first search space of a control resource set for the downlink control information associated with the first radio access technology, wherein the control resource set is associated with the first radio access technology; and monitoring a second search space of the control resource set for the downlink control information associated with the second radio access technology, wherein receiving the downlink control information is based at least in part on monitoring the first search space and monitoring the second search space.

19. The method of claim 18, wherein the first search space and the second search space are non-overlapping.

20. The method of claim 18, wherein:

the first search space and the second search space overlap, and the first search space is associated with a first radio network temporary identifier and the second search space is associated with a second radio network temporary identifier, wherein receiving the downlink control information is based at least in part on the first radio network temporary identifier and the second radio network temporary identifier.

21. The method of claim 18, wherein:

the first search space and the second search space overlap, and the first search space is associated with a first downlink control information length and the second search space is associated with a second downlink control information length, wherein receiving the downlink control information is based at least in part on the first downlink control information length and the second downlink control information length.

22. A user equipment (UE) for wireless communications, comprising:

means for monitoring for a downlink control information for a first radio access technology, or a second radio access technology, or both;

means for generating a first candidate value of the downlink control information based at least in part on the first radio access technology based at least in part on the monitoring;

means for generating a second candidate value of the downlink control information based at least in part on the second radio access technology based at least in part on the monitoring;

means for receiving, based at least in part on generating the first candidate value and the second candidate value, the downlink control information for the first radio access technology, or the second radio access technology, or both, in a downlink control channel of the first radio access technology; and means for communicating via the second radio access technology based at least in part on receiving the downlink control information.

23. The UE of claim 22, wherein the means for generating the first candidate value and the second candidate value further comprise:

means for monitoring a search space of a control resource set for the downlink control information;

means for generating the first candidate value of the downlink control information using a first radio network temporary identifier associated with the first radio access technology based at least in part on monitoring the search space; and means for generating the second candidate value of the downlink control information using a second radio network temporary identifier associated with the second radio access technology based at least in part on monitoring the search space.

24. The UE of claim 22, wherein the means for generating the first candidate value and the second candidate value further comprise:

means for monitoring a search space of a control resource set for the downlink control information;

means for generating the first candidate value of the downlink control information using a first downlink control information length associated with the first radio access technology based at least in part on monitoring the search space; and means for generating the second candidate value of the downlink control information using a second downlink control information length associated with the second radio access technology based at least in part on monitoring the search space.

25. The UE of claim 22, wherein the means for monitoring for the downlink control information further comprise:

means for monitoring a first search space of a first control resource set for the downlink control information associated with the first radio access technology, wherein the first control resource set is associated with the first radio access technology; and means for monitoring a second search space of a second control resource set for the downlink control information associated with the second radio access technology, wherein the second control resource set is associated with the second radio access technology, wherein receiving the downlink control information is based at least in part on monitoring the first search space and monitoring the second search space.

26. A non-transitory computer-readable medium storing code for wireless communications, the code comprising instructions executable by one or more processors to:

monitor for a downlink control information for a first radio access technology, or a second radio access technology, or both;

generate a first candidate value of the downlink control information based at least in part on the first radio access technology based at least in part on the monitoring;

generate a second candidate value of the downlink control information based at least in part on the second radio access technology based at least in part on the monitoring;

receive, based at least in part on generating the first candidate value and the second candidate value, the downlink control information for the first radio access technology, or the second radio access technology, or both, in a downlink control channel of the first radio access technology; and communicate via the second radio access technology based at least in part on receiving the downlink control information.

27. The non-transitory computer-readable medium of claim 26, wherein the downlink control information comprises an indication field indicative of whether the downlink control information is associated with the first radio access technology or the second radio access technology.

28. The non-transitory computer-readable medium of claim 26, wherein the instructions to receive the downlink control information are further executable by the one or more processors to:

receive the downlink control information associated with the second radio access technology via the first radio access technology, wherein the downlink control information comprises a first radio network temporary identifier indicative of a first band of the second radio access technology or a second radio network temporary identifier indicative of a second band of the second radio access technology.

29. The non-transitory computer-readable medium of claim 26, wherein the instructions are further executable by the one or more processors to:

transmit a report indicating one or more capability parameters associated with communicating control information for the second radio access technology, wherein receiving the downlink control information for the second radio access technology is based at least in part on transmitting the report.

30. The non-transitory computer-readable medium of claim 29, wherein the one or more capability parameters comprise a timing gap between receiving the downlink control information via the downlink control channel of the first radio access technology and communicating via the second radio access technology.

* * * * *